United States Patent [19]

Koyata

[11] Patent Number: 6,097,880
[45] Date of Patent: *Aug. 1, 2000

[54] DIGITAL SIGNAL PROCESSING METHOD, DIGITAL SIGNAL PROCESSING APPARATUS, DIGITAL SIGNAL RECORDING METHOD, DIGITAL SIGNAL RECORDING APPARATUS, RECORDING MEDIUM, DIGITAL SIGNAL TRANSMISSION METHOD AND DIGITAL SIGNAL TRANSMISSION APPARATUS

[75] Inventor: Tomohiro Koyata, Chiba, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/912,765

[22] Filed: Aug. 18, 1997

[30] Foreign Application Priority Data

Aug. 20, 1996 [JP] Japan .................................. 8-218819

[51] Int. Cl.⁷ .............................. H04N 5/917; H04N 5/91
[52] U.S. Cl. ............................................ 386/112; 386/104
[58] Field of Search ..................................... 548/397, 398, 548/399, 400, 403, 405, 409, 410, 411, 412, 415, 420; 382/232, 236, 238, 248, 250; 386/112, 109, 96, 99, 101, 106, 27, 33, 39; H04N 5/917, 5/91

[56] References Cited

U.S. PATENT DOCUMENTS

| | | | |
|---|---|---|---|
| 4,455,649 | 6/1984 | Esteban et al. ............................. | 370/80 |
| 4,516,241 | 5/1985 | Farah et al. ............................ | 370/110.1 |
| 4,535,472 | 8/1985 | Tomcik ...................................... | 381/31 |
| 4,912,763 | 3/1990 | Galand et al. ............................. | 381/31 |
| 4,972,484 | 11/1990 | Theile et al. ............................... | 381/37 |
| 5,115,240 | 5/1992 | Fujiwara et al. ........................... | 341/51 |
| 5,150,387 | 9/1992 | Yoshikawa et al. ...................... | 375/122 |
| 5,185,800 | 2/1993 | Mahieux .................................... | 381/29 |
| 5,231,484 | 7/1993 | Gonzales et al. ......................... | 358/133 |
| 5,264,846 | 11/1993 | Oikawa ..................................... | 341/76 |
| 5,294,925 | 3/1994 | Akagiri ...................................... | 341/50 |
| 5,301,205 | 4/1994 | Tsutsui et al. .............................. | 375/1 |
| 5,375,189 | 12/1994 | Tsutsui .................................. | 395/2.38 |
| 5,381,143 | 1/1995 | Shimoyoshi et al. ..................... | 341/51 |
| 5,471,558 | 11/1995 | Tsutsui .................................. | 395/2.28 |
| 5,490,170 | 2/1996 | Akagiri et al. ........................... | 375/240 |
| 5,634,082 | 5/1997 | Shimoyoshi et al. .................. | 395/2.38 |
| 5,640,421 | 6/1997 | Sonohara et al. ....................... | 375/240 |
| 5,673,289 | 9/1997 | Kim et al. ................................ | 375/243 |
| 5,825,935 | 10/1998 | Murakoshi .............................. | 382/248 |

FOREIGN PATENT DOCUMENTS

| | | | |
|---|---|---|---|
| 0289080 A1 | 11/1988 | European Pat. Off. .......... | H04B 1/66 |
| 0421259 A2 | 4/1991 | European Pat. Off. .......... | H04B 1/66 |

(List continued on next page.)

OTHER PUBLICATIONS

R. Crochiere Et Al., "Digital Coding of Speech in Sub-Bands," The Bell System Technical Journal, vol. 55, No. 8, Oct. 1976, pp. 1069–1085.

(List continued on next page.)

*Primary Examiner*—Robert Chevalier
*Attorney, Agent, or Firm*—Limbach & Limbach L.L.P.

[57] ABSTRACT

In the above-mentioned digital signal processing method providing the base of the invention, in the case where the total number of bits assigned to all the two-dimensional blocks fails to coincide with the bit rate specified in the coding format as a result of converting the bit allocation amount into an integer in calculating the bit allocation amount for each of the time-frequency two-dimensional blocks, then in order to attain coincidence therebetween, the maximum quantization error that may occur in the two-dimensional block for each of the time-frequency two-dimensional blocks is calculated based on the maximum signal component in the two-dimensional block or the normalized data and the assigned bit amount provisionally calculated, and the maximum quantization error is regarded as the degree of bit requirement for each two-dimensional block, so that the bits are adjusted based on the degree of bit requirement.

9 Claims, 11 Drawing Sheets

FOREIGN PATENT DOCUMENTS

| | | |
|---|---|---|
| 0423050 A1 | 4/1991 | European Pat. Off. .......... H04B 1/66 |
| 0446031 A3 | 9/1991 | European Pat. Off. .......... H04B 1/66 |
| 0525809 A2 | 2/1993 | European Pat. Off. .......... H04B 1/66 |
| 0568290 A1 | 11/1993 | European Pat. Off. .......... H03G 7/00 |
| 0599315 A2 | 6/1994 | European Pat. Off. ........ G11B 20/00 |
| 0610007 A2 | 8/1994 | European Pat. Off. .......... H04B 1/66 |
| WO 92/17884 | 10/1992 | WIPO ............................ G11B 20/10 |

OTHER PUBLICATIONS

J. Princen Et Al., "Subband/Transform Coding Using Filter Bank Designs Based on Time Domain Aliasing Cancellation," ICASSP Apr. 6–9, 1987, vol. 4, 2161–2164.

R. Zelinski Et Al., "Adaptive Transform Coding of Speech Signals," IEEE Transactions on Acoustics, Speech and Signal Processing, vol. ASSP–25, No. 4, Aug. 1977, pp. 299–309.

M. Krasner, "The Critical Band Coder—Digital Encoding of Speech Signals Based on the Perceptual Requirements of the Auditory System," IEEE Apr. 1980, vol. 1–3, pp. 327–331.

J. Rothweiler, "Polyphase Quadrature Filters—A New Subband Coding Technique," IEEE Int'l Conference on Acoustics, Speech and Signal Processing, vol. 3 of 3, Apr. 14–16, 1983, pp. 1280–1283.

Long mode

Short Mode

Middle Mode A

Middle Mode B

DIGITAL SIGNAL PROCESSING METHOD, DIGITAL SIGNAL PROCESSING APPARATUS, DIGITAL SIGNAL RECORDING METHOD, DIGITAL SIGNAL RECORDING APPARATUS, RECORDING MEDIUM, DIGITAL SIGNAL TRANSMISSION METHOD AND DIGITAL SIGNAL TRANSMISSION APPARATUS

BACKGROUND OF THE INVENTION

1. Field of the Invention

The present invention relates to a digital signal processing method, a digital signal processing apparatus, a digital signal recording method, a digital signal recording apparatus, a recording medium, a digital signal transmission method and a digital signal transmission apparatus.

2. Description of the Related Art

Although methods and apparatuses are variously available for high efficiency coding of an audio signal, conventional examples thereof will be explained below. A conventional method is a transform coding method making up one of the blocking frequency subband coding methods in which an audio signal in the time domain is blocked per unit time, and the signal on a time axis for each block is orthogonal-transformed into a signal in the frequency domain thereby to divide the same into a plurality of frequency bands and to encode the same for each frequency band. Another conventional method is subband coding (SBC: Subband Coding) making up one of the nonblocking frequency subband coding methods in which an audio signal in the time domain is not blocked per unit time but coded by being split into a plurality of frequency bands. A high efficiency coding method is also available which is a combination of the above-mentioned subband coding method and the transform coding method. As an example of the above combined high efficiency coding, after the frequency band is split by the subband coding method, the signal for each band is orthogonally transformed into a frequency-domain signal by the above-mentioned transform coding method, and the signal is coded for each band thus orthogonally transformed.

The subband filter used for the subband coding method includes a quadrature mirror filter (QMF: Quadrature Mirror Filter) or the like, for example, which is described in 1976 R. E. Crochiere "Digital Coding of Speech in Subbands" Bell Syst. Tech. J. Vol. 55, No.8, 1976. Also, ICASSP 83, BOSTON Polyphase Quadrature Filters-A new subband coding technique, Joseph H. Rothweiler, describes an equal bandwidth filter splitting method and an apparatus using such a filter as a polyphase quadrature filter (PQF: Polyphase Quadrature Filter).

One of the above-mentioned orthogonal transform methods is such that, for example, an input audio signal is blocked in a predetermined unit time and transformed for each block from time axis to frequency axis by the fast Fourier transform, the discrete cosine transform (DCT) or the modified DCT transform (MDCT) or the like. The above-mentioned MDCT is described in ICASSP 1987 Subband/Transform Coding Using Filter Bank Designs Based on Time Domain Aliasing Cancellation, J. P. Princen and A. B. Bradley, Univ. of Surrey Royal Melbourne Inst. of Tech.

Further, a band splitting is available in which the human acoustic characteristics are taken into consideration in determining a frequency splitting width in quantizing each frequency component split into frequency subbands. Specifically, the audio signal is sometimes split into a plurality of bands (say, 25 bands) by a band splitting method, generally called a critical band, where the high-frequency bandwidth is widened. At this time, in coding the data for each split band, a predetermined bit allocation is performed for each band, or an adaptive bit allocation is performed for each band for coding. When the MDCT coefficient data obtained by the above-mentioned MDCT process is coded by the above-mentioned bit allocation, for example, the MDCT coefficient data obtained by the MDCT process for each block is coded by the adaptively distributed number of bits.

Further, in coding for each band, what is called the block floating (Block Floating: block floating) process is used for realizing a more efficient coding by normalization and quantization for each band. Specifically, when the MDCT coefficient data obtained by the above-mentioned MDCT process is coded, normalization and quantization are carried out corresponding to the maximum absolute value of the MDCT coefficient for each band. As a result, a more efficient coding is accomplished.

Conventionally, the two methods described below are used in the bit allocation technique described above.

In IEEE Transactions of Acoustics, Speech, and Signal Processing, Vol. ASSP-25, No.4, August 1977, the bit allocation is carried out based on the signal magnitude for each band. On the other hand, ICASSP 1980 The Critical Band Coder—digital encoding of the perceptual requirements of the auditory system M. A. Kransner, MIT, describes a method in which a signal-to-noise ratio required for each band is obtained by utilizing the acoustic masking thereby to carry out a fixed bit allocation.

With the above-mentioned conventional high efficiency coding method and apparatus, the bit allocation amount for each band to be quantized is converted into an integer or the like when calculating it. Therefore, the total number of the bits assigned to all the bands generally fails to coincide with the bit rate specified in the coding format. A bit adjustment operation is thus required for attaining coincidence. A method conceivable for this bit adjusting operation consists in determining the order of priority based on the frequency. In such a case, however, the input signal is not considered at all and therefore adaptive adjusting does not occur. Another conceivable method makes the bit adjustment strictly depending on the input signal. In this case, however, it is necessary to take into consideration again the quantization error for all the signal components and the masking effects again or the like. Thus, the adjusting operation becomes very large in scale.

SUMMARY OF THE INVENTION

The present invention has been developed in view of this actual situation, and is intended to propose a digital signal processing method, a digital signal processing apparatus, a digital signal recording method, a digital signal recording apparatus, a recording medium, a digital signal transmission method or a digital signal transmission apparatus, in which an input digital signal is split into a plurality of frequency band components thereby to obtain signal components in a plurality of time-frequency two-dimensional blocks. Data are normalized based on the signal components in the two-dimensional block for each of the time-frequency two-dimensional blocks thereby to obtain normalized data. A quantization coefficient representing the feature of the signal components in the two-dimensional block for each of the time-frequency two-dimensional blocks is obtained. A bit allocation amount is determined based on the quantization coefficient thus determined. The signal components in each of the time-frequency two-dimensional blocks are quantized by the bit allocation amount and the normalized data thereby to compress information, while at the same time, producing a information compression parameter for each of the time-frequency two-dimensional blocks. The adjusting operation dependent on the input digital signal is accomplished, realizing an efficient coding with a proper amount of process for the adjusting operation for an improved static characteristic and an improved signal quality.

The present invention provides a digital signal processing method, in which an input digital signal is split into a plurality of frequency band components thereby to obtain signal components in a plurality of time-frequency two-dimensional blocks. Data in each of the time-frequency two-dimensional blocks are normalized based on the signal components in the two-dimensional block thereby to obtain a normalized data. A quantization coefficient representing the feature of the signal components in the two-dimensional block for each of the time-frequency two-dimensional blocks is obtained. A bit allocation amount is determined based on the quantization coefficient. The signal components in the block for each of the time-frequency two-dimensional blocks are quantized according to the normalized data and the bit allocation amount thereby to compress information, while at the same time obtaining an information compression parameter for each of the time-frequency two-dimensional blocks. According to this method, if the total number of bits assigned to all the two-dimensional blocks fails to coincide with the bit rate specified in the coding format as a result of converting the bit allocation amount into an integer in calculating the bit allocation amount for each of the time-frequency two-dimensional blocks, in order to attain coincidence therebetween, the maximum quantization error that may occur in each of the time-frequency two-dimensional blocks is calculated based on the maximum signal component in the two-dimensional block or the normalized data and the assigned bit amount provisionally calculated. This maximum quantization error is regarded as the degree of bit requirement for each two-dimensional block, so that the bits are adjusted based on the degree of bit requirement.

In the digital signal processing method according to the present invention, the adjusting operation is performed based on the input digital signal, so that an efficient coding is realized with a reasonable amount of processing in an adjusting operation thereby improving the static characteristics and the signal quality.

DESCRIPTION OF THE PREFERRED EMBODIMENTS

An embodiment of the present invention will be explained below with reference to the drawings.

In this embodiment, an input digital signal such as an audio PCM signal or the like is coded at a high efficiency using the techniques of subband coding (SBC), adaptive transform coding (ATC) and adaptive bit assignment. These techniques will be explained with reference to FIG. 1 and subsequent drawings.

Figure 1:
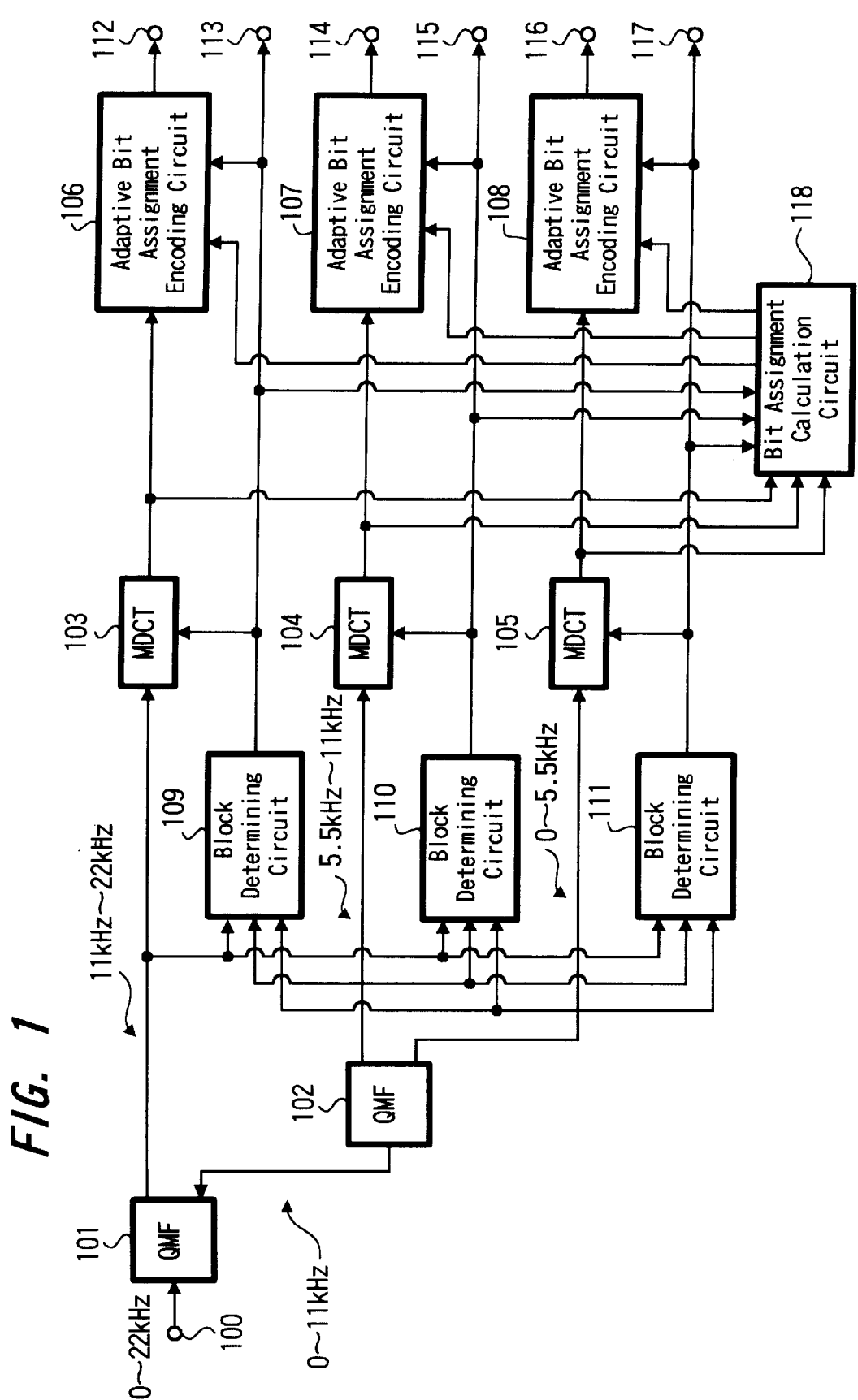
FIG. 1 is a block circuit diagram showing a specific example of a high efficiency compression coding encoder usable for bit-rate compressed coding according to an embodiment of the present invention.
Figure 2A:
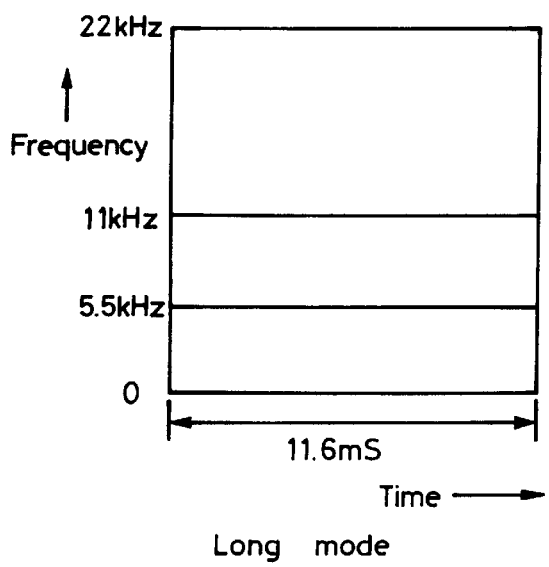
FIGS. 2A to 2D are each a diagram showing a structure of an orthogonal transform block for bit compression.
Figure 2B:
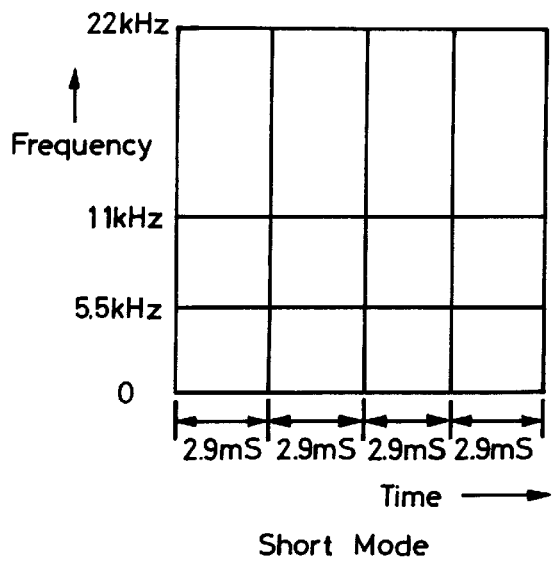
Figure 2C:
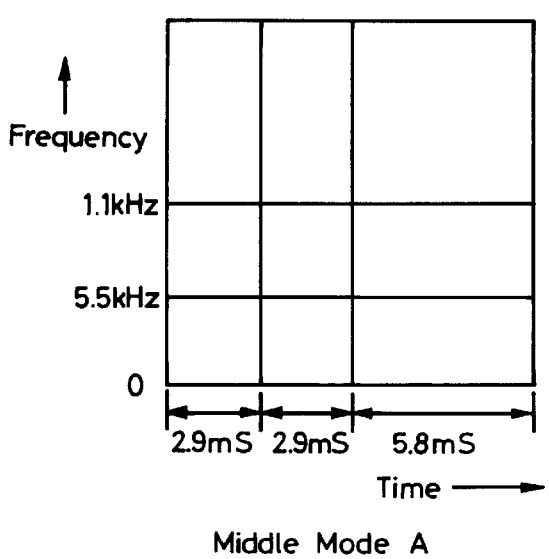
Figure 2D:
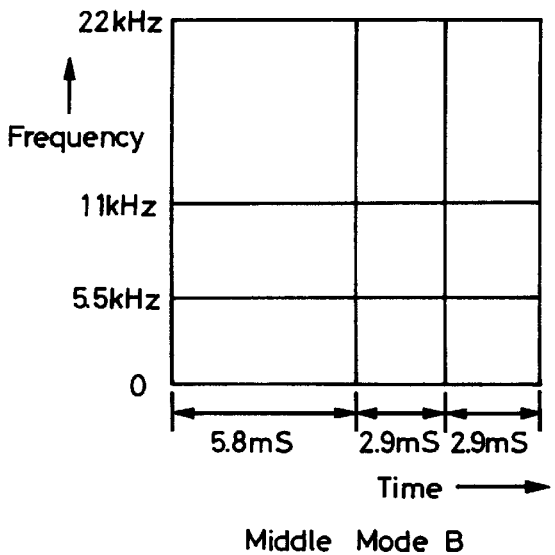

A specific high efficiency encoder shown in FIG. 1 divides an input digital signal into a plurality of frequency bands, and orthogonally transforms the same for each frequency band. Then, the spectral data on a frequency axis thus obtained is adaptively coded by bit assignment for each of what is called the critical bands by taking the human acoustic characteristics into account in a low-frequency range, and for each band subdivided from the critical bandwidth by taking the block floating efficiency into consideration in a middle frequency range. Normally, this block constitutes the one for generating quantization noises. Further, in the embodiment of the present invention, the block size (block length) is adaptively changed in accordance with the input signal before the orthogonal transform.

Specifically, in FIG. 1, an audio signal in the frequency band of 0 to 22 kHz, for example, is sampled with the sampling frequency of 44.1 kHz, after which the input audio PCM signal obtained by PCM coding is supplied to an input terminal 100. This input audio PCM signal is split into the band of 0 to 11 kHz and the band of 11 kHz to 22 kHz by a band splitting filter 101 including what is called a QMF (quadrature mirror filter) filter or the like. Further, the signal in the band of 0 to 11 kHz is split into the band of 0 to 5.5 kHz and the band of 5.5 kHz to 11 kHz by a band splitting filter 102 including a QMF filter or the like in similar fashion.

The above-mentioned signal in the band of 11 kHz to 22 kHz from the band splitting filter 101 is applied to a MDCT (or, equivalently, a modified discrete cosine transform) circuit (modified discrete cosine transform means, or an orthogonal transform means) 103 constituting an example of an orthogonal transform circuit for the MDCT processing. The signal in the band of 5.5 kHz to 11 kHz from the band splitting filter 102 is supplied to a MDCT circuit (or, equivalently, a modified discrete cosine transform means, or an orthogonal transform means) 104 for the MDCT processing. The signal in the band of 0 to 5.5 kHz from the band splitting filter 102, on the other hand, is supplied to a MDCT circuit (or, equivalently, a modified discrete cosine transform means, or an orthogonal transform means) 105 for the MDCT processing. The MDCT circuits 103, 104, 105 each perform the MDCT processing based on the block size (or, equivalently, a information compression parameter indicating the length of the processing block) determined by block determining circuits 109, 110, 111, respectively, prepared for the respective bands.

As described above, one means for splitting an input digital signal into a plurality of frequency bands is a QMF filter, for example, which is described in 1976 R. E. Crochiere Digital Coding of Speech in Subbands Bell Syst. Tech. J. Vol. 55, No.8, 1976. Also, ICASSP 83, Boston Polyphase Quadrature Filters—A New Subband Coding Technique Joseph H. Rothweiler, describes a method of splitting a signal with an equal bandwidth by a filter or the like. The orthogonal transform described above includes the one, for example, in which an input audio signal is blocked in a predetermined unit time thereby to transform the time axis transformed into a frequency axis by the fast Fourier transform (FFT), the discrete cosine transform (DCT), the modified DCT transform (MDCT) or the like for each block. The MDCT is described in ICASSP 1987 Subband/Transform coding using Filter Bank Designs Based on Time Domain Aliasing Cancellation, J. P. Princen, A. B. Bradley, Univ. of Surrey Royal Melbourne Inst. of Tech.

A specific example of the standard input digital signal for the block of each band supplied to the MDCT circuits 103, 104, 105 is shown in FIGS. 2A to 2D. In this specific example shown in FIGS. 2A to 2D, output signals of the three filters each have a plurality of independent orthogonal transform block sizes for each band, and the time resolution thereof is adapted to be switched according to time characteristic, the frequency distribution, etc. of the signal. In the case where the signal is temporally quasi-steady, the orthogonal transform block size is increased to 11.6 mS as indicated by the long mode in FIG. 2A. In the case where the signal is not steady, on the other hand, the orthogonal transform block size is further split into two and four portions. Specifically, as shown by the short mode in FIG. 2B, all the block sizes are split into four, i.e. a time resolution of 2.9 mS, or as shown in a middle mode A of FIG. 2C or a middle mode B of FIG. 2D, a portion of the block sizes is split into two, i.e., 5.8 mS, and other portions into four, i.e. into a time resolution of 2.9 mS, thereby adapting to the actual complicated input digital signal. The orthogonal transform block sizes can be more effective by a more complicated splitting, provided the scale of the processing unit permits such spliting.

This orthogonal transform block size is determined by the orthogonal transform block size determining circuits (or, equivalently, a orthogonal transform block size determining means) 109, 110, 111 shown in FIG. 1. The results of the determination are supplied to the respective MDCT circuits 103, 104, 105 and to a bit assignment calculation circuit 118, while at the same time being provided from output terminals 113, 115, 117 as block size information (or, equivalently, a information on the length of the processing block indicated by an information compression parameter) for each block.

The spectral data on the frequency axis obtained by the MDCT processings in the MDCT circuits 103, 104, 105 or the MDCT coefficient data, which are the signal components in the time-frequency two-dimensional blocks, are gathered for each of what is called the critical bands in a low frequency range, while in a higher-frequency range, on the other hand, by taking the effectiveness of the block floating, the critical bandwidth is subdivided and applied to adaptive bit assignment coding circuits 106, 107, 108 and the bit assignment calculation circuit 118.

This critical band is a frequency range split that takes the human acoustic characteristics into consideration, and may be viewed as a band having noise generated by masking a given pure sound by a narrow-band noise having the same intensity in the neighborhood of the frequency of the pure sound. This critical band is wider in bandwidth for higher frequencies. All the frequency bands of 0 to 22 kHz described above, for example, are split into 25 critical bands.

The bit assignment calculation circuit 118 calculates the energy, or a peak value, for each split band and the masking amount for each split band based on the critical band. The block floating takes into consideration what is called the masking effect based of the block size information, the spectral data and the MDCT coefficient data described above. On the basis of the calculation result, the number of assigned bits for each band is determined and supplied to each of the adaptive bit assignment coding circuits 106, 107, 108. These adaptive bit assignment coding circuits 106, 107, 108 normalize and quantize the respective spectral data or the MDCT coefficient data in accordance with the number of bits thus assigned to each split band by taking into consideration the above-mentioned block size information (or, equivalently, the information compression parameter that indicates the length of the processing block), the critical band and the block floating. The data coded in this way are provided through output terminals 112, 114, 116 in FIG. 1. For the sake of explanation, each split band, including the above-mentioned critical band and the block floating that provides a unit for bit assignment, is hereinafter called a unit block.

Figure 3:
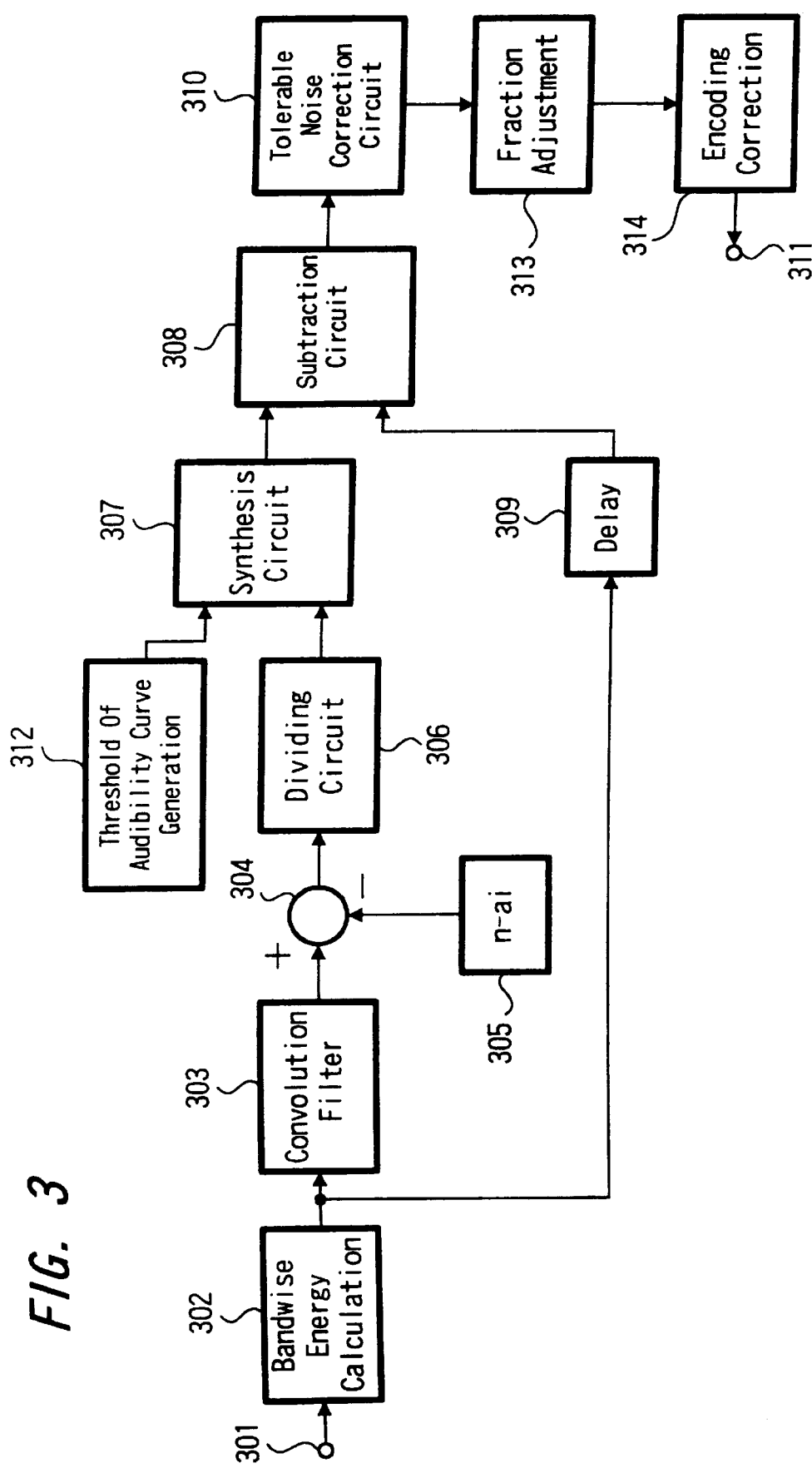
FIG. 3 is a block circuit diagram showing an example of bit allocation calculation function.

Now, a specific method of bit assignment performed in the bit assignment calculation circuit 118 in FIG. 1 will be explained with reference to FIG. 3. FIG. 3 is a block circuit diagram showing a general configuration of a specific example of the bit assignment calculation circuit 118 in FIG. 1. In FIG. 3, an input terminal 301 is supplied with the spectral data on the frequency axis or the MDCT coefficients from the MDCT circuits 103, 104, 105 in FIG. 1 and the block size information from the block determining circuits 109, 110, 111 in FIG. 1. After that, in the system shown in FIG. 3, the process is performed using the constants, the weighting functions, etc. adaptive to the block size information.

Figure 6:
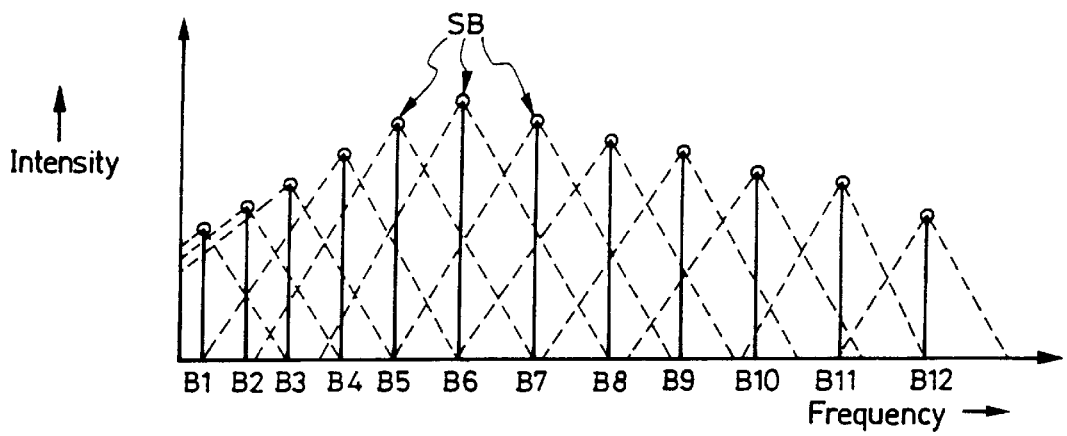
FIG. 6 is a diagram showing spectra of the bands taking each critical band and a block floating into consideration.

In FIG. 3, the spectral data on the frequency axis or the MDCT coefficient data input from the input terminal 301 is supplied to a bandwise energy calculation means for each band 302, so that the energy at every unit block is determined by calculating the total sum of the amplitude values in the unit blocks, for example, or the like. Instead of the energy for each band, the peak amplitude value, the average amplitude value, etc. may be used. As an output from the energy calculation circuit 302, a spectrum SB of the total sum of each band is shown in FIG. 6, as an example. FIG. 6 shows the case, for simplifying the illustration, in which the block is split into 12 unit blocks (B1 to B12). The broken lines in FIG. 6 indicate the effect that the spectrum SB of the total sum of each band has on the other portions and corresponds to the weighting of the convolution.

Also, the energy calculation circuit 302 determines a scale factor (or normalized data) value indicating the state of the block floating of the unit block. Specifically, for example, several positive values are prepared in advance as candidates for scale factor values. The minimum candidate higher than the maximum absolute value of the MDCT coefficient or the spectral data in the unit block is employed as a scale factor value of the unit block. The scale factor value can be numbered using several bits corresponding to the actual value and the number is stored by a ROM or the like (not shown). Also, the scale factor value determined by the above-mentioned method for a certain unit block is the number attached using the above-mentioned bits corresponding to the determined value as subsidiary information.

Then, in order to take into consideration the effect of what is called the masking on the above-mentioned spectrum SB which is determined in the above-mentioned energy calculation circuit 302, a convolution processing is performed in which the particular spectrum SB is multiplied by a predetermined weighting function and added. To this end, the output of the energy calculation circuit 302 for each band described above, i.e., each value of the spectrum SB thereof is supplied to a convolution filter circuit 303. The convolution filter circuit 303 includes, for example, a plurality of delay elements for sequentially delaying the input data, a plurality of multipliers for multiplying filter coefficients (weighting functions) with the outputs of the delay elements, and a total sum adder for taking the total sum of the outputs of the respective multipliers. This convolution process can produce the total sum of the portions indicated by the broken lines in FIG. 6.

Then, the output of the above-mentioned convolution filter circuit 303 is supplied to a subtractor 304. This subtractor 304 is for determining a level $\alpha$ corresponding to a tolerable noise level. The level $\alpha$, corresponding to the tolerable noise level, as will be described later, is such that a tolerable noise level is attained for each critical band by an inverted convolution process. The subtractor 304 is supplied with a tolerable function, which is a function representing the masking level for determining the level $\alpha$. The level $\alpha$ is controlled by increasing and decreasing the tolerable function. The tolerable function is supplied from a (n−ai) function generating circuit 305 as described below.

Specifically, if it is given i as the number assigned in the ascending order of the frequency of the critical band, the level $\alpha$ corresponding to the tolerable noise level can be determined from the following equation (1).

$$\alpha = S - (n - ai) \quad (1)$$

In equation (1), n and a are constants where a>0, and S is the intensity of a convoluted bark spectrum (Bark Spectrum) (a unit of the critical band representing one spectrum for each critical band). The tolerable function is given by (n−ai) in equation (1). For example, n=38 and a=1 can be used.

In this way, the above-mentioned level $\alpha$ is determined, and the resulting data is supplied to a divider 306. The divider 306 is for performing an inverted convolution of the level $\alpha$ in the convoluted region described above. By performing this inverted convolution, a masking spectrum can be obtained from the above-mentioned level $\alpha$. In other words, this masking spectrum provides a tolerable noise spectrum. The above-mentioned inverted convolution process, which requires a complicated calculation, can be performed using the simplified divider 306 according to this embodiment.

Figure 7:
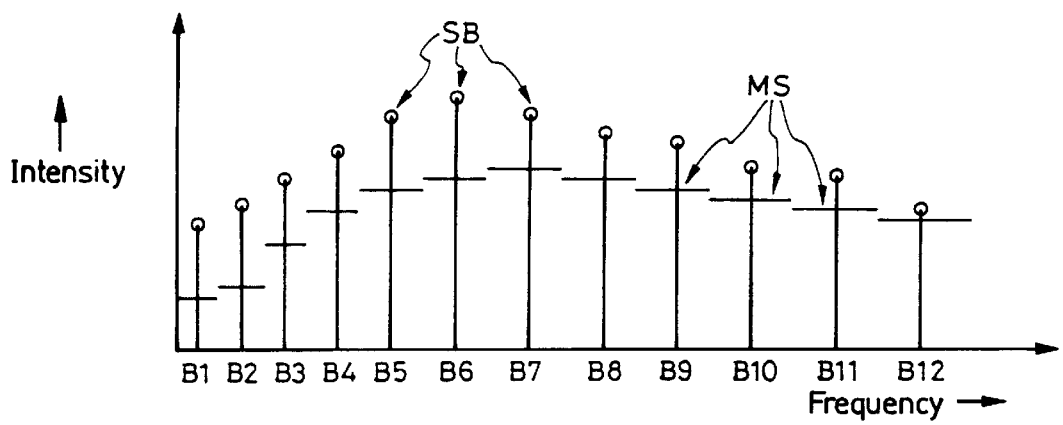
FIG. 7 is a diagram showing masking spectra.

As the next step, the above-mentioned masking spectrum is supplied to a subtractor 308 through a synthesis circuit 307. The subtraction circuit 308 is supplied with the output from the energy detection circuit 302 for each band described above, i.e., the spectrum SB described above, through a delay circuit 309. Consequently, the subtraction circuit 308 performs the subtraction between the above-mentioned masking spectrum and the spectrum SB, thereby masking the portion of the above-mentioned spectrum SB equal to or lower in level than that of a particular masking spectrum MS, as shown in FIG. 7.

Figure 8:
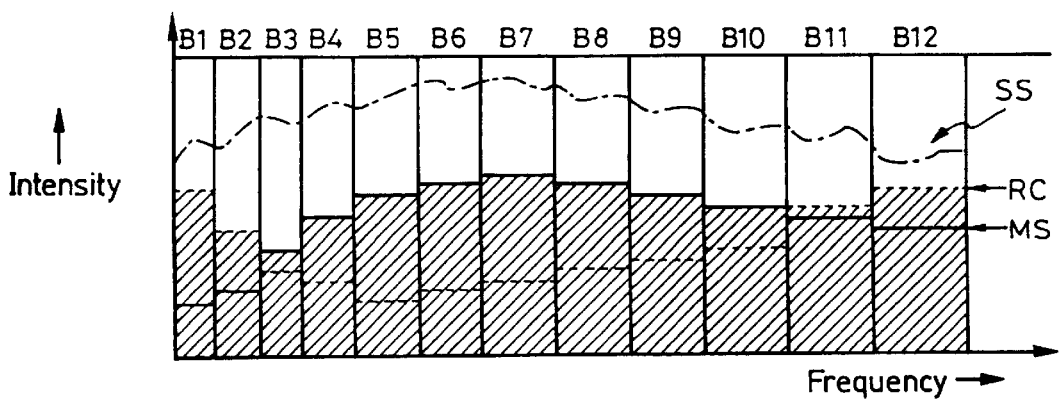
FIG. 8 is a diagram showing a synthesis of a minimum audible curve and masking spectra.

Upon completion of the synthesis performed by the above-mentioned synthesis circuit 307, data indicating what is called a minimum audible curve RC representing the human acoustic characteristic as shown in FIG. 8 is calculated by a minimum audible curve generating circuit 312 based upon the above-mentioned masking spectrum MS. If the absolute level of a noise is equal to or lower than the minimum audible curve, the noise is not audible. This minimum audible curve, if coded the same way, becomes different by the difference in the reproduction volume, for example, at the time of playback. In an actual digital system, however, music applied to the 16-bit dynamic range, for example, is not substantially different. Assuming that the quantization noise in the audible frequency range of about 4 kHz, which is the easiest to hear, is not audible, then the quantization noise below the level of this minimum audible curve cannot be heard in the other frequency ranges. As a result, suppose that the system is used in such a manner that the noise is not heard in the neighborhood of 4 kHz in the word length of the system. If an attempt is made to attain a tolerable noise level by synthesizing this minimum audible curve RC and the masking spectrum MS with each other, the resulting tolerable noise level can be defined by the hatched portion in FIG. 8. In this embodiment, the 4 kHz range of the above-mentioned minimum audible curve is set to the lowest level which is equivalent to 20 bits, for example. Also, FIG. 8 shows a signal spectrum SS for the same time.

Returning to FIG. 3, a tolerable noise correcting circuit 310 corrects the tolerable noise level of the output from the above-mentioned subtractor 308 based on the information of an equal loudness-level curve, for example. The equal loudness-level curve is defined as a characteristic curve for the human acoustic characteristic formed by connecting the sound levels of the frequencies audible with the same loudness as the pure sound of 1 kHz, for example, and is also called the loudness equal sensitivity curve. Also, this equal loudness-level curve is plotted substantially in the same curve as the minimum audible curve RC shown in FIG. 8. In this equal loudness-level curve, even if the sound level drops by 8 to 10 dB at about 4 kHz from the sound level at 1 kHz, for example, the sound at 4 kHz is perceived as substantially the same level as the sound at 1 kHz. At about 50 Hz, on the other hand, a sound level not higher by about 15 dB than a sound level at 1 kHz cannot be heard as the same sound level. For this reason, the tolerable noise level beyond the level of the above-mentioned minimum audible curve is preferably given by a curve corresponding to the equal loudness-level curve. From these facts, the correction of the above-mentioned tolerable noise level taking the above-mentioned equal loudness-level curve into consideration is adaptive to the human acoustic characteristic. By the process mentioned above, the tolerable noise correcting circuit 310 provisionally calculates the assigned bits for each unit block based on various parameters including the masking, the acoustic characteristics and so on described above.

Figure 9:
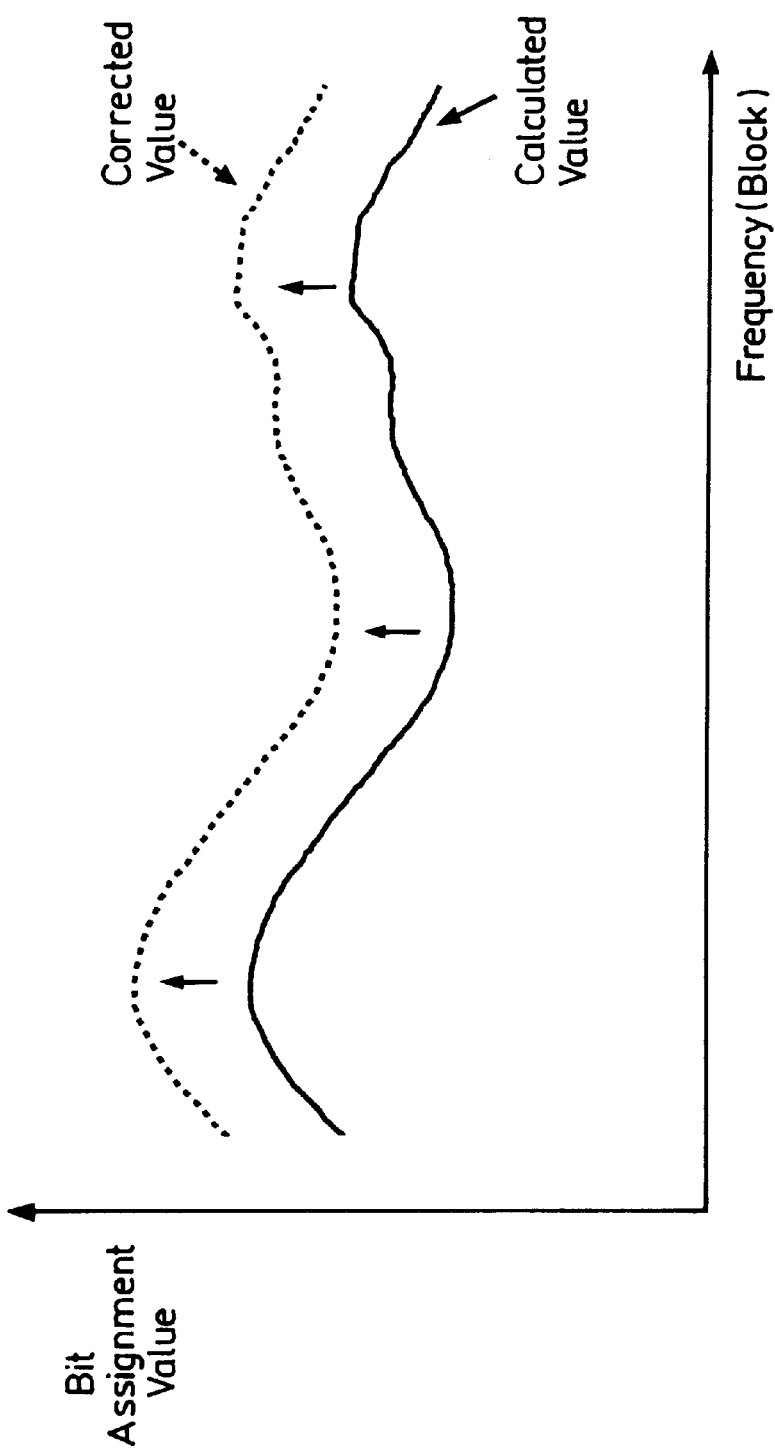
FIG. 9 is, a graph showing an operation of correcting a total bit assignment amount by increasing a bit assignment amount uniformly across frequency blocks.
Figure 10:
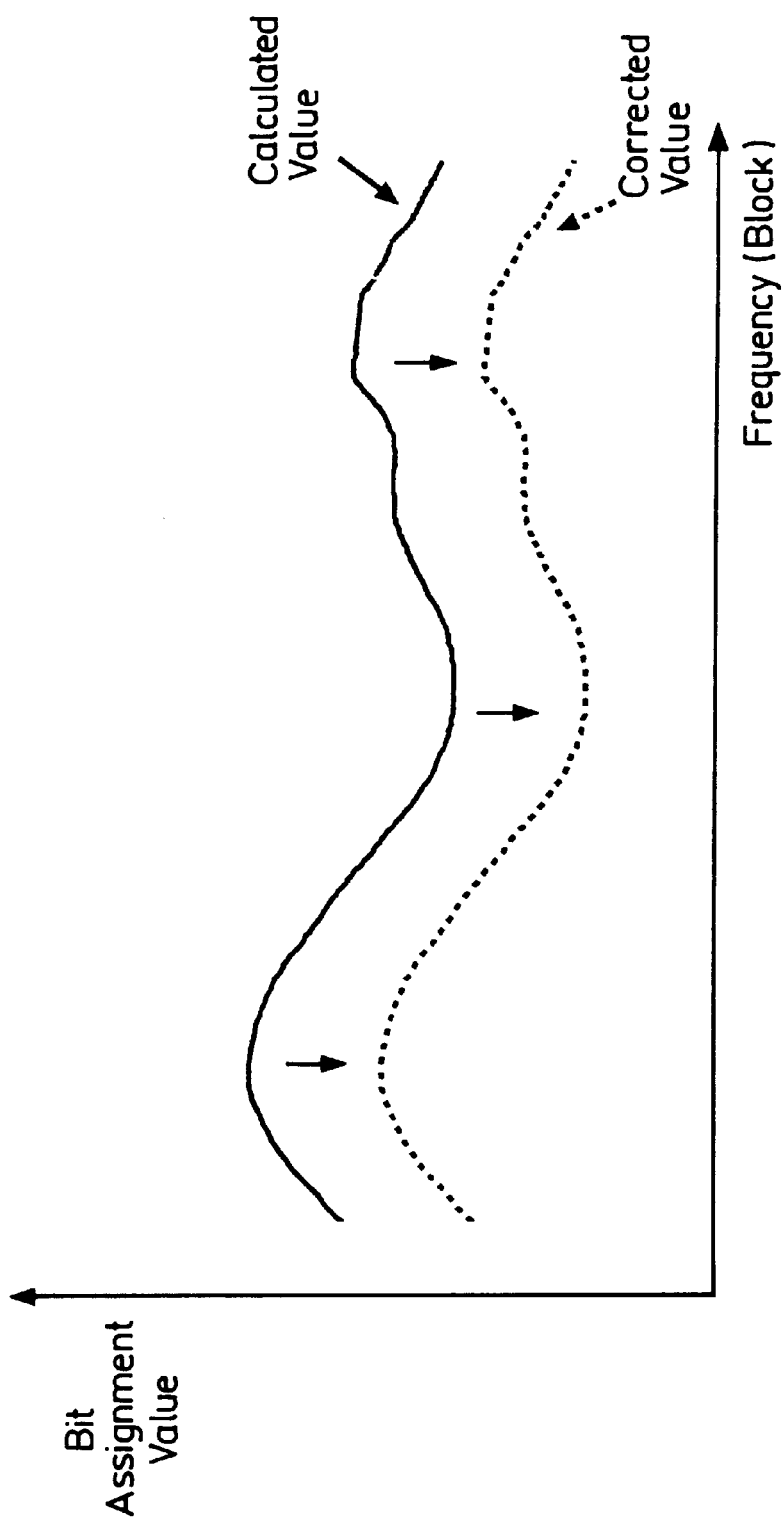
FIG. 10 is a graph showing an operation of correcting a total bit assignment amount by reducing the bit assignment amount uniformly across frequency blocks.

Further, in view of the fact that the total number of assigned bits provisionally calculated for each unit block by the preceding process generally fails to coincide with the number of usable bits determined by the bit rate of the coding unit, the tolerable noise correcting circuit 310 performs the correcting operation for attaining coincidence between the assigned number of bits and the bit rate. This correction method can be implemented in such a manner as to maintain the relative relations of the assigned bits calculated for each unit block. In the case where the total number of the assigned bits calculated as above is smaller than the number of usable bits, for example, the number of all the assigned bits is uniformly increased as shown in FIG. 9. In the case where the total number of assigned bits calculated as above is greater than the number of usable bits, on the other hand, the number of all the assigned bits is uniformly decreased as shown in FIG. 10. In other words, the tolerable noise correcting circuit 310 produces the assigned bits for each unit block after this correcting operation is carried out. This correcting operation, though performed using the tolerable noise correcting circuit 310 in the foregoing description, can alternatively be performed in the stage preceding the above-mentioned tolerable noise correcting circuit 310 in the case where the fraction adjustment described later is performed in the final stage of processing after the correcting process in FIG. 3.

The above-mentioned correcting operation can realize substantially the same total number of assigned bits as the number of usable bits. Since the bit assignment value of each unit block determined by the preceding series of process is calculated as a real number, however, conversion into an integer by disregarding or the like is sometimes required in actual practice. Also, the unit blocks for which more than the maximum number of assigned bits permitted by the coding format is calculated or the unit blocks calculated as a negative value by the above-mentioned correcting operation require conversion into an integer as a bit assignment value in the range allowable by the coding format. Generally, this operation of converting into an integer causes an excess or shortage of bits as the total number of reassigned bits fails to coincide with the number of usable bits determined by the bit rate. In the process, in the case where the total number of assigned bits calculated is smaller than the number of usable bits, it follows that the bits are excessive in number. For more efficient coding, therefore, an operation is required for assigning excess usable bits. In the case where the total number of assigned bits calculated is greater than the number of usable bits and therefore the bits are deficient, on the other hand, the right coding is impossible, and therefore an operation is required for reducing the number of assigned bits. The adjusting operation required by conversion into an integer or the like within the framework of the coding format described above will hereinafter be called the fraction adjustment.

A fraction adjusting circuit 313 in FIG. 3 calculates a maximum quantization error that may occur in each unit block from the maximum signal component in the unit block or from the bit assignment providing the word length or from the normalized data constituting the scale factors for each unit block. The fraction adjusting circuit performs the fraction adjusting operation based on the magnitude of the maximum quantization error.

Now, explanation will be made about a method of calculating the maximum quantization error that provides an indicator of the bit requirements for each unit block in the fraction adjusting circuit 313.

Figure 11:
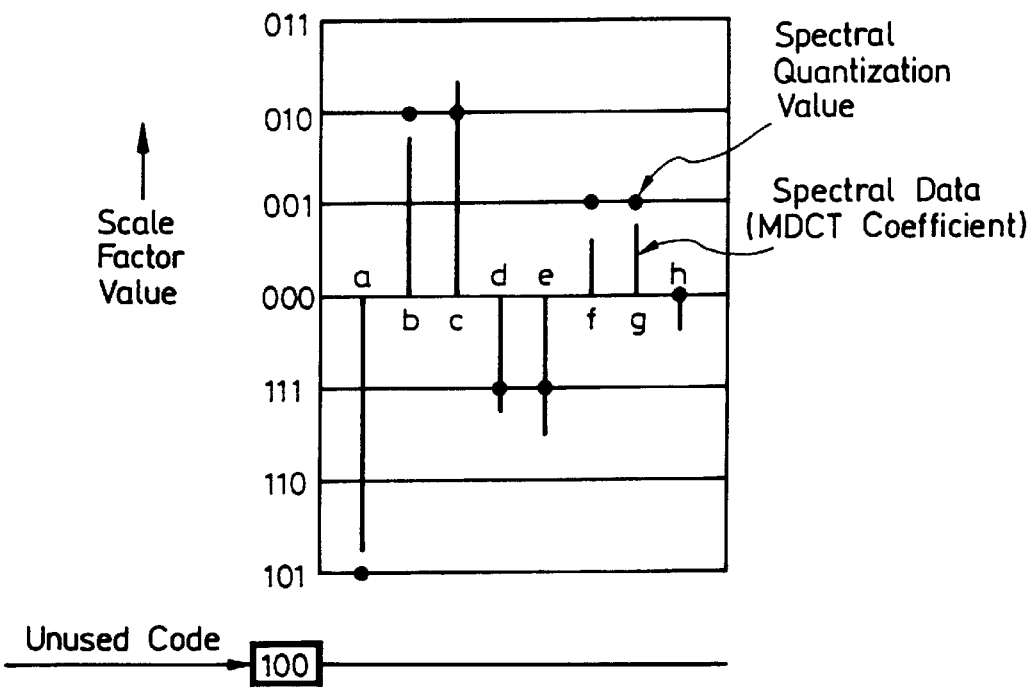
FIG. 11 is a diagram showing an example of quantization of signal components in a unit block for bit assignment.

First, with reference to FIG. 11, explanation will be made about a specific example of coding using the data obtained by processing the orthogonal transform output spectrum. The output spectrum is produced as main information by subsidiary information, the scale factor representing the block floating obtained as subsidiary information and the word length representing the length of the word. FIG. 11 shows an example of the states of a unit block assigned with three bits. The ordinate represents the magnitude of the spectral data or the MDCT coefficient with the center thereof as zero, and the abscissa represents the frequency. In this example, eight spectral data or MDCT coefficients indicated by a, b, c, d, e, f, g and h are existent in the unit block, each having a magnitude in the positive or negative direction from zero. The scale factor indicating the block floating state as described above is selected as the minimum one assuming a value larger than the maximum absolute value of the spectral data or the MDCT coefficients, as the case may be, in the unit block.

In FIG. 11, the scale factor value is selected as the spectrum a indicating the maximum absolute value. This scale factor and the size of bit assignment are used to determine the width of quantization in the unit block. The example shown in FIG. 11 represents the case in which three bits are assigned. Although eight values can be originally expressed by coding with three bits, the case under consideration is such that three values are taken as quantization widths equally split in positive and negative directions about zero. Thus, seven quantization values are used, including zero, while the remaining code (e.g., 100) is not used. The quantization value is determined from the scale factor value and the bit assigned value in the unit block. The spectral data or the MDCT coefficients in the unit block are quantized to the nearest quantization value. The black dots in FIG. 11 show the quantized values of the respective MDCT coefficients or the spectral data in the unit block. In other words, FIG. 11 shows an example of requantization (normalization followed by quantization).

In the case where the quantization width (or QW) is set to have equal divisions in the positive and negative directions about zero by the method as shown in FIG. 11, then the quantization width QW for a given unit block can be determined by equation (2) below. The value of the scale factor is SF and the number of assigned bits is Nb of the same unit block.

$$QW = -SF/\{2^{(Nb-1)} - 1\}, \text{ where } Nb \geq 2 \qquad (2)$$

In this case, the maximum quantization error that can occur in the unit block is QW/2, that is one half of the quantization width.

Also, where the unit block has zero bit assignment, all the spectra or the MDCT data in the unit block are quantized to zero. The maximum quantization error that can occur in the unit block in this case, therefore is the maximum absolute value of the spectra or the MDCT data in the unit block.

Now, consider the magnitude of the quantization noise of a unit block. Strictly speaking, it is necessary to take into consideration the number of spectra or the actual magnitude of the quantization error contained in the unit block. This, however, requires the calculation for all the spectra, which involves a vast amount of processing, and therefore is rather impractical. Where there is not any extreme difference in the number of spectra among the unit blocks, the larger the maximum quantization error that can occur in a unit block determined by the above-mentioned method, the larger the quantization noise is likely to be. In a simplistic way, therefore, the degree of bit requirement for the unit block can be considered large. In this case, the calculation for the unit block alone suffices. As compared with the case where the calculation is made for all the spectra, therefore, the processing requirement can be considerably reduced.

The fraction adjusting circuit 313 first calculates the maximum quantization error that can occur in each of all the unit blocks using the above-mentioned method, and regards this value as the degree of bit requirement for each of the unit blocks. After that, if the total number of the assigned bits calculated is smaller than the usable number of bits, then the unit block having the maximum degree of bit requirement is detected and the excess bits are assigned to the same unit block. As for the unit block newly assigned with the excess bits, the degree of bit requirement is calculated anew by the above-mentioned method including the excess bit assignment. After that, the fraction adjusting circuit 313 repeats a series of steps including: (1) the detection of a unit block having the maximum degree of bit requirement, (2) the assignment of excess bits and (3) the recalculation of the degree of bit requirement for the unit block. These steps are repeated as long as the assignment of excess bits is possible. In the process, if all bits allowed by the coding format have already been assigned to a unit block or the excess bits are not sufficient in number to increase the bit assignment to a unit block due to the number of spectra in the unit block, then such unit blocks are removed as an object of the adjusting operation. The adjustment of excess bits can also be performed in a coding correction circuit 314 as well. The bit shortage adjusting process, however, is not necessarily performed in the coding correction circuit 314.

The process of adjusting the excess bits will be explained in detail with reference to the flowchart of FIG. 4. Step ST-1 sets the block number to zero, and then the process proceeds to step ST-2 for deciding whether the bit assignment is zero or not. If the decision in step ST-2 is YES, the process proceeds to step ST-3 for setting the bit requirement degree equal to the maximum absolute value of the signal components in the block. If the decision is NO, on the other hand, the process proceeds to step ST-4 for setting the bit requirement degree equal to the maximum quantization error (QW/2). After steps ST-3 and ST-4, the process proceeds to step ST-5.

Step ST-5 decides whether or not the number of recorded blocks is equal to the block number plus one. If the decision is NO, the process proceeds to step ST-6 for increasing the block number by one, and then the process returns to step ST-2. If the decision is YES, on the other hand, the process proceeds to step ST-7 for deciding whether or not the number of usable bits is equal to or larger than the total number of assigned bits.

Figure 5:
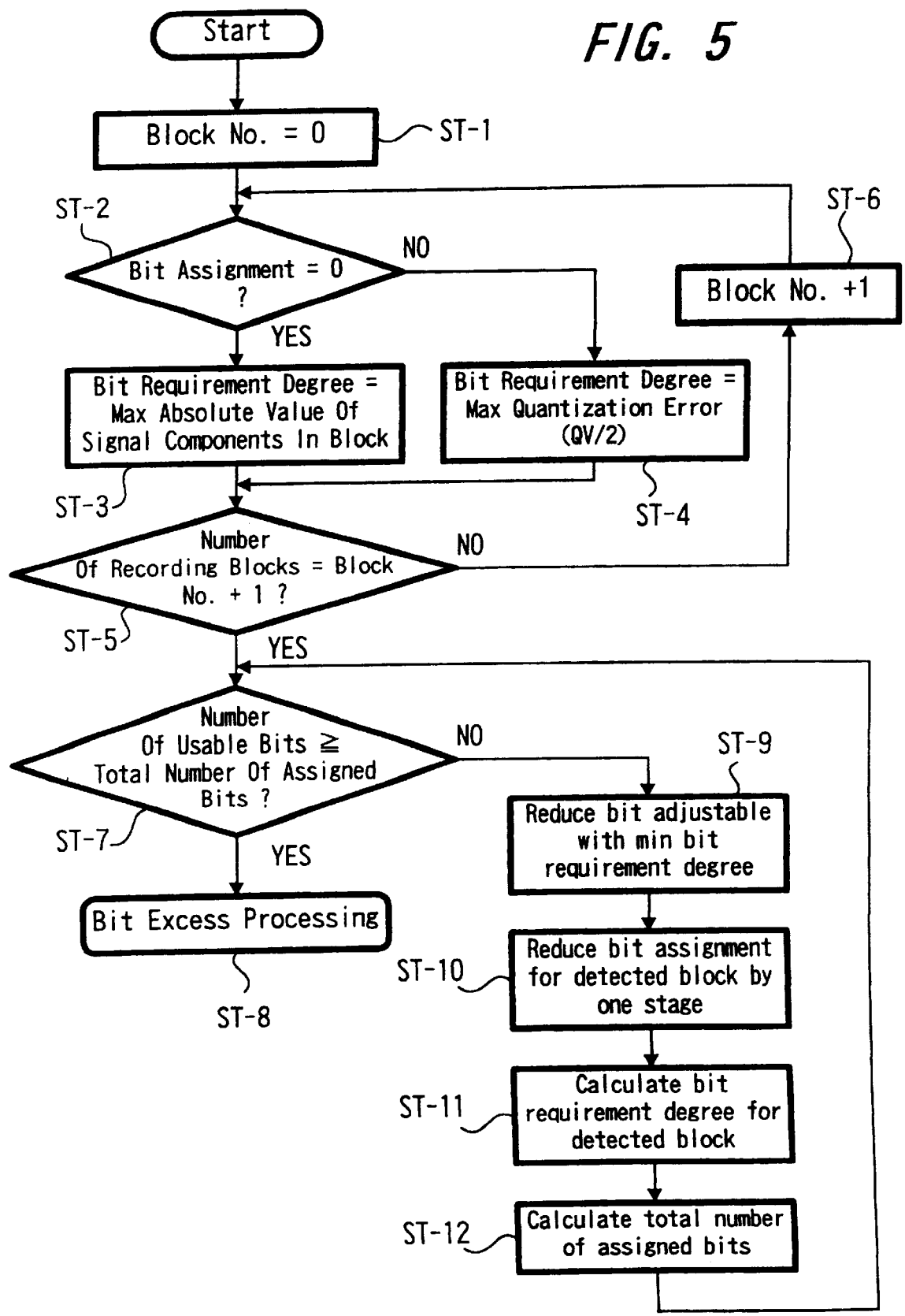
FIG. 5 is a flowchart showing a process of adjusting to a bit shortage.

In the case where the decision in step ST-7 is NO, the process proceeds to step ST-9 for carrying out the bit shortage process (the processes at step ST-9 and subsequent steps are shown in FIG. 5). If the decision in step ST-7 is YES, on the other hand, the process proceeds to step ST-8 for setting all the blocks as adjustable blocks. After step ST-8, the process is passed to step ST-10 for deciding whether there exists an adjustable block or not. If the decision in step ST-10 is NO, the process is terminated, while if the decision is YES in step ST-10, the process proceeds to step ST-11 for detecting a block having the maximum bit requirement degree among the adjustable blocks.

After step ST-11, the process proceeds to step ST-12 for deciding whether or not the bit assignment of the detected block can be incremented by one stage. If the decision in step ST-11 is NO, the process proceeds to step ST-14 for resetting the detected block from an adjustable block to a non-adjustable block, after which the process returns to step ST-10. If the decision is YES, on the other hand, the process proceeds to step ST-13 for incrementing the bit assignment of the detected block by one stage.

After step ST-13, the process proceeds to step ST-15 for calculating the bit requirement degree (maximum quantization error QW/2) of the detected block. After step ST-15, the process is passed to step ST-16 for calculating the total number of assigned bits, and then returns to step ST-11.

The foregoing description refers to the case in which the total number of assigned bits calculated is smaller than the number of usable bits and so there are excess bits. In the case where the total number of assigned bits calculated is larger than the usable bits and so there is a bit deficiency, however, the operation opposite to the above-mentioned case, i.e., deleting the bits in ascending order of bit requirement degree, is described below.

Specifically, in the case where the total number of assigned bits calculated is larger than the number of usable bits and a shortage of bits occurs, a unit block having a minimum bit requirement degree is detected and the bits are deleted from the same unit block. The bit requirement degree for the unit block from which bits are deleted is recalculated by the above-mentioned method using the bit assignment value after bit deletion. After that, the fraction adjusting circuit 313 repeats the process of (1) detecting a unit block having a minimum bit requirement degree, (2) deleting the bits from it, and (3) recalculating the bit requirement degree thereof until the total number of assigned bits is reduced below the number of usable bits. In the process, a unit block having a bit assignment of zero is removed as an object of adjusting operation.

The adjusting operation to be performed when a shortage of bits occurs will be explained in detail with reference to FIG. 5. After step ST-1 sets the block number to zero, the process proceeds to step ST-2 for deciding whether the bit assignment is equal to zero or not. If the decision in step ST-2 is YES, the process proceeds to step ST-3 for setting the bit requirement degree equal to the maximum absolute value of the signal component in the block. In the case where the decision in step ST-2 is NO, on the other hand, the process proceeds to step ST-4 for setting the bit requirement degree equal to the maximum quantization error (QW/2). After steps ST-3 and ST-4, the process proceeds to step ST-5.

Step ST-5 decides whether or not the number of recorded blocks is equal to the block number plus one. If the decision is NO, the process proceeds to step ST-6 for increasing the block number by one and then returns to step ST-2. When the decision in step ST-5 is YES, on the other hand, the process proceeds to step ST-7 for deciding whether or not the number of usable bits is equal to or larger than the total number of assigned bits. The process of steps ST-1 to ST-7 is shared by the excess bit processing shown in FIG. 4.

Figure 4:
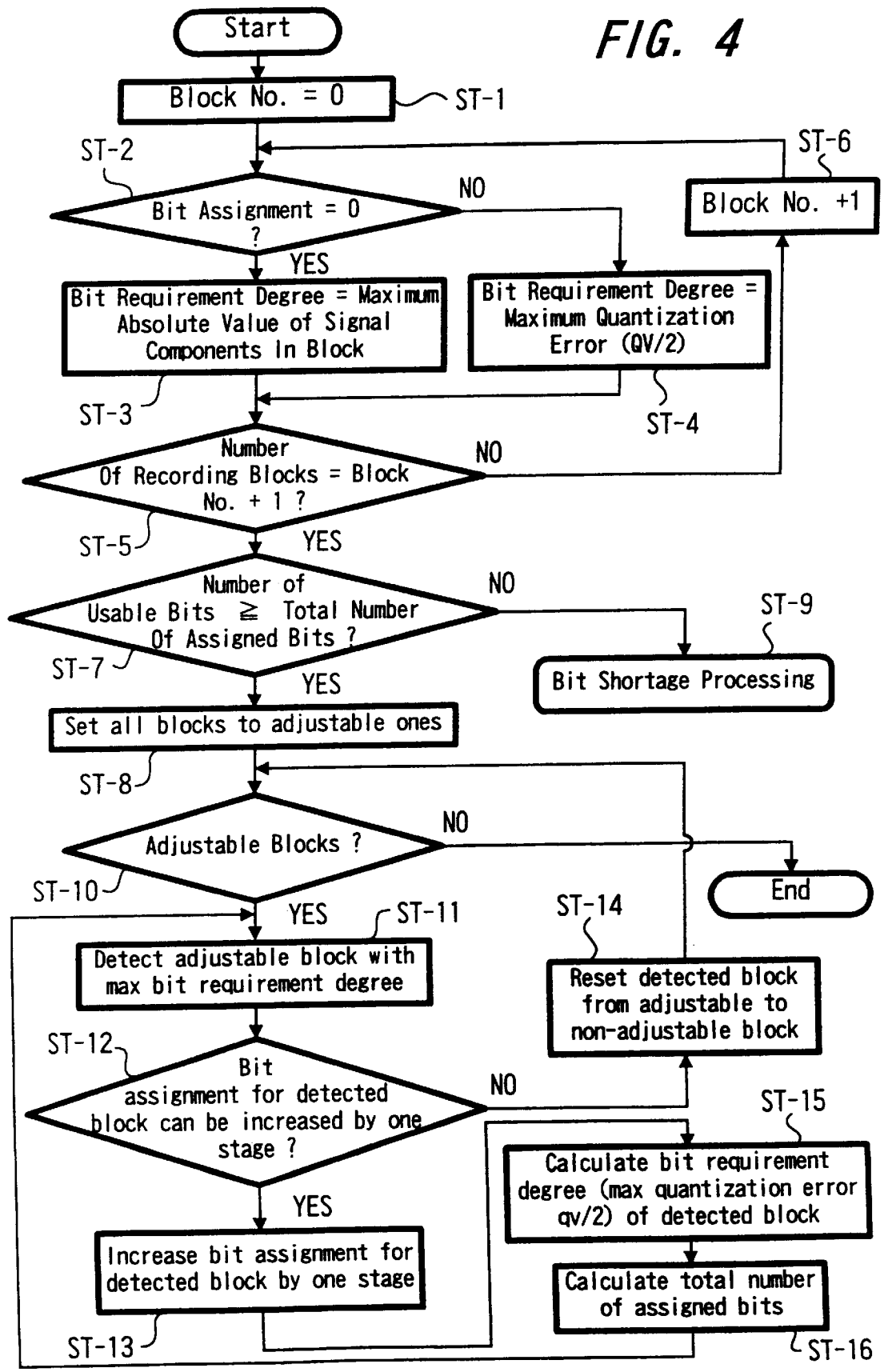
FIG. 4 is a flowchart showing a process of adjusting for excess bits.

If the decision in step ST-7 is YES, the process proceeds to step ST-8 for carrying out the excess bit process (the process in and after step ST-8 in FIG. 4). In the case where the decision in step ST-7 is NO, on the other hand, the process proceeds to step ST-9 for detecting a block having the minimum bit requirement degree among those adjustable blocks (blocks having a bit assignment of other than zero), after which the process is passed to step ST-10.

Step ST-10 reduces the bit assignment for the detected block by one stage, and then the process proceeds to step ST-11. Step ST-11 calculates the bit requirement degree of the detected block, after which the process proceeds to step ST-12. Step ST-12 calculates the total number of assigned bits, and then the process returns to step ST-7.

The above-mentioned fraction processing is possible also in a way not dependent on the input signal. The adjusting operations can be combined in such a way that the excess bit processing is adjusted by determining the bit requirement degree as described above while performing the shortage of bits processing by adjustment in a manner not dependent on the input signal. Alternatively, the excess bit processing is performed in dependence on the input signal while the short bit adjusting processing is performed by determining the bit requirement degree as described above.

The output from the fraction processing circuit 313, i.e., the bit assignment value after fraction adjustment for each unit block is applied to the coding correction circuit 314. The coding correction circuit 314 detects a unit block having a minimum of previously prepared scale factors. This unit block has all the spectra or the MDCT coefficients, which are the signal components in the time-frequency two-dimensional block thereof, quantized to zero in spite of the assignment of two or more bits thereto. Then, the bit assignment for the unit block is reduced to zero, so that the bits that have been used for the code of spectral data or the MDCT coefficient are omitted and the bits obtained by the omission are effectively distributed.

Figure 12:
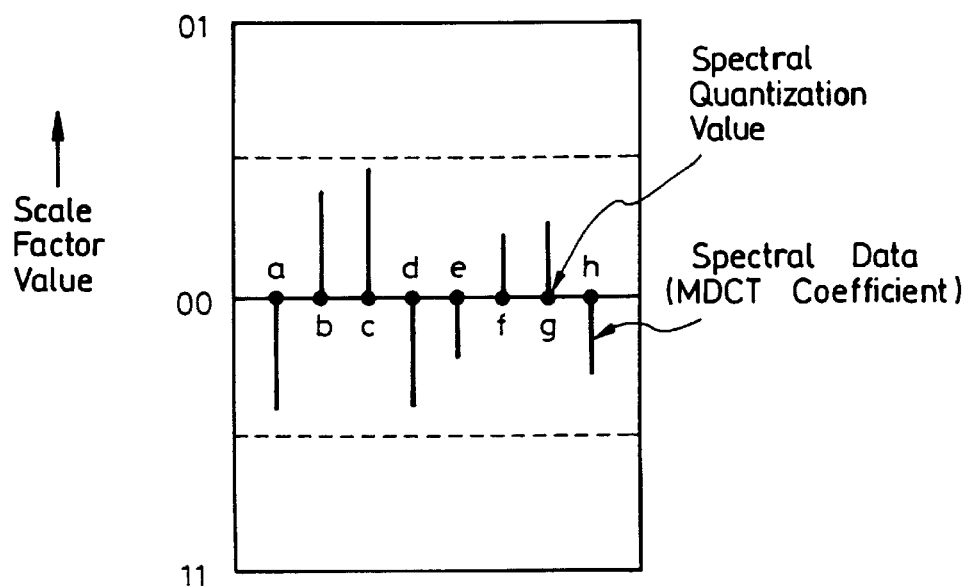
FIG. 12 is a diagram showing an example of quantizing all the signal components to zero in a unit block for bit assignment.

Now, an example of correction in the coding correction circuit 314 will be explained with reference to FIG. 12. FIG. 12, like FIG. 11, shows the manner in which a certain unit block is requantized. The vertical direction represents the magnitude of the spectrum or the magnitude of the MDCT coefficient, and the horizontal direction represents the frequency. Eight spectra or MDCT coefficients are present in the unit block. In the shown example, the maximum absolute value of the MDCT coefficient or the spectrum in the unit block is smaller than the minimum scale factor prepared in advance, and the scale factor value for the unit block is the smallest one among those prepared in advance. The assigned bits are two bits which assume zero and one value each in positive and negative directions for a total of three quantized values, as shown in FIG. 12.

In the case of two-bit assignment where the maximum absolute value of the spectrum or the MDCT coefficient in the unit block is smaller than one half of the quantization width as shown by dotted lines in FIG. 12, however, all the spectra or the MDCT coefficients in the unit block are quantized to zero. Specifically, all the eight spectra a to h are coded as "00", so that all the quantized values are zero although at least 16 bits are required for recording the spectra. In such a case, subsidiary information or the like causes all the recording for the unit block to become zero. In this case, the subsidiary information or the like causes the recording not to be made for the unit block but all the spectra or the MDCT coefficients in the unit block can be regarded as zero by changing the bit assignment to zero bits. In the above-mentioned case of two-bit assignment, therefore, exactly the same coding is possible without using the 16 bits used for the quantized value "00" of the spectra or the MDCT coefficients. In other words, in the case where all the quantized values of the spectra or the MDCT coefficients are zero, the bits that have thus far been used for coding the spectra or the MDCT coefficients can be omitted for performing exactly the same coding by reducing the bit assignment of the unit block to zero.

In the case of other than two-bit assignment as shown in FIG. 12, assume a unit block where the minimum one of the scale factors (normalized data including information compression parameters) prepared in advance is generally employed as the scale factor value. Let the maximum absolute value of the spectra or the MDCT coefficients in the unit block be SPmax. Then, using the quantization width QW of the unit block determined from the above-mentioned equation (2), the quantization values of the spectra or the MDCT coefficients in the unit block satisfying the conditions of the following equation (3) are all zero.

The coding correction circuit 314 detects a unit block of which the coding can be corrected by the above-mentioned method using equation (3) below, and thus the bit assignment is corrected to zero thereby to produce a new usable bit.

$$SP\text{max} < QW/2 \tag{3}$$

Also, depending on the coding format, assume that subsidiary information is available indicating the effectiveness of a unit block, that is, indicating whether a unit block is to be recorded or not. The subsidiary information may indicate the bit assignment to zero, for example. If the subsidiary information indicating the effectiveness of the unit block is used not to code the block, the scale factor representing the subsidiary information of the processing block and the bits of the subsidiary information that have been used for bit assignment can also be omitted. In such a case, the subsidiary information can be changed into an adaptive form by the coding correction circuit 314 shown in FIG. 3 thereby omitting the bits and producing new usable bits.

The coding correction circuit 314 redistributes the newly-acquired usable bits in the case where the correction by the above-mentioned method is possible. In the process of redistribution, it is apparent that the adjusting operation is possible by calculating the bit requirement degree for a unit block that was carried out in the above-mentioned fraction adjusting circuit 313. The data thus corrected by the coding correction circuit 314 are produced as an output from a bit assignment calculation circuit 118 in FIG. 1.

Specifically, in the bit assignment calculation circuit 118 shown in FIG. 1, the above-mentioned system shown in FIG. 3 can produce main information by the data processing the orthogonal transform output spectrum and subsidiary information including the scale factor indicating the block floating condition and the word length indicating the length of the word. Based on this information, the adaptive bit assignment coding circuits 106, 107, 108 in FIG. 1 actually carry out the requantization and the coding operation in a way conforming to the coding format.

Figure 13:
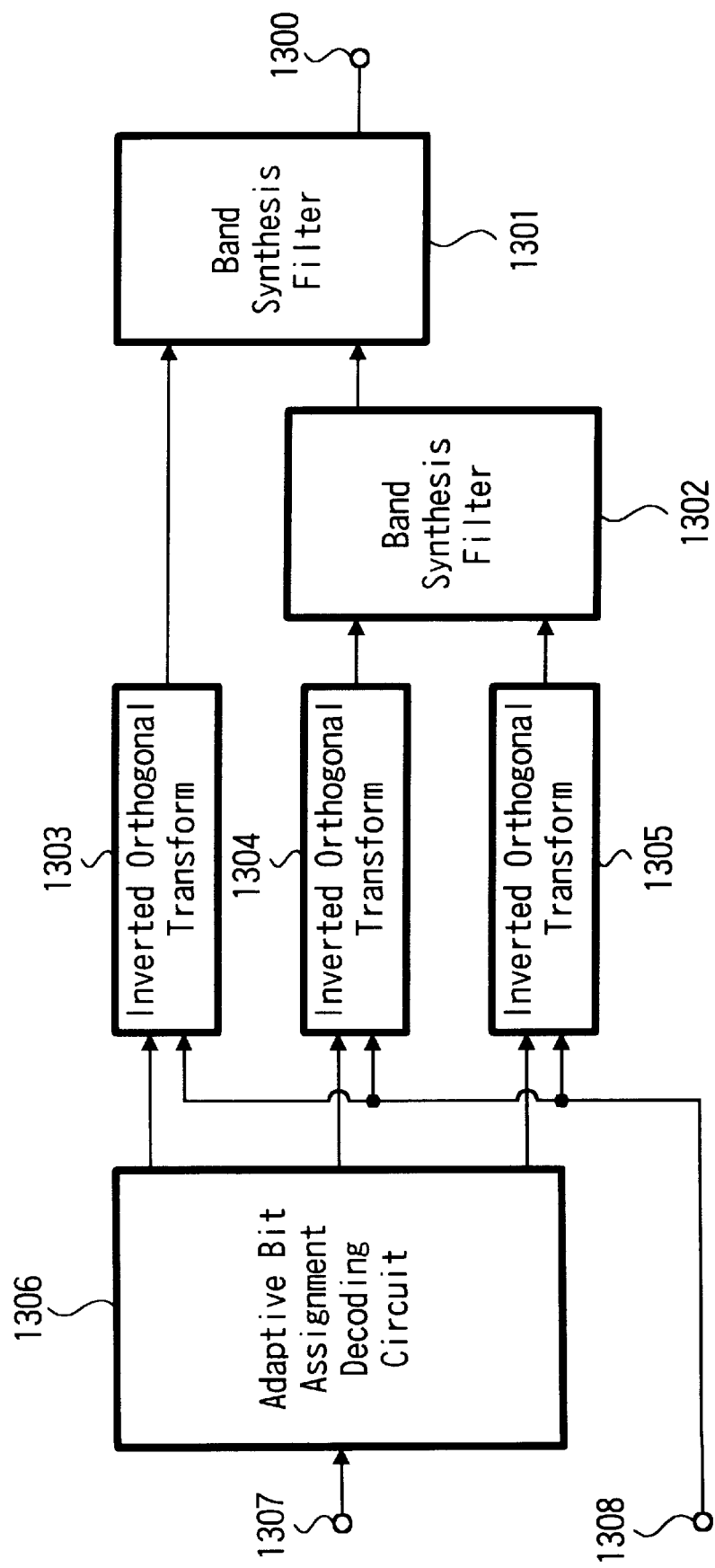
FIG. 13 is a circuit block diagram showing a specific example of a high efficiency compression decoder usable for the bit-rate compressed encoding according to the above-mentioned embodiment.

With reference to FIG. 13, a decoder of a signal coded at a high efficiency by the above-mentioned encoder shown in FIG. 1 will be explained. The MDCT coefficient quantized for each band, i.e., the data equivalent to the output signals at the output terminals 112, 114, 116 in FIG. 1 are applied to an input terminal 1307 in FIG. 13, while the block size information that has been used, i.e., the data equivalent to the output signals of the output terminals 113, 115, 117 in FIG. 1 are applied to an input terminal 1308 in FIG. 13. An adaptive bit assignment decoding circuit (or, equivalently, adaptive bit assignment decoding means) 1306 cancels the bit assignment using the adaptive bit assignment information. Then, inverted orthogonal transform (IMDCT) circuits 1303, 1304, 1305 transform the signal on the frequency axis into the signal on the time axis. These time-axis signals for the partial bands are decoded into a full-band signal by the band synthesis filter (IQMF) circuits 1302, 1301 in FIG. 13, and delivered to an output terminal 1300.

Figure 14:
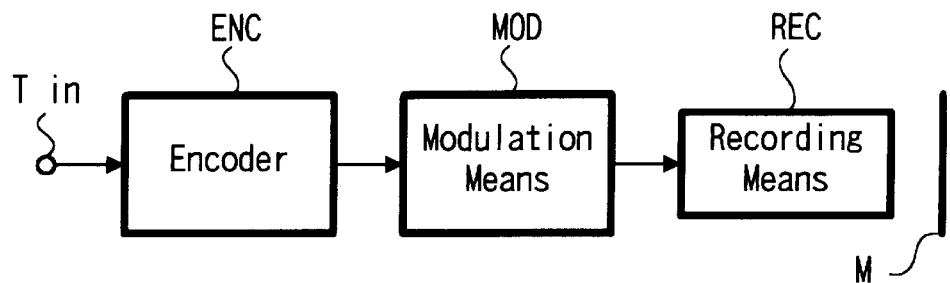
FIG. 14 is a block diagram showing a recording apparatus according to an embodiment of the present invention.

Then, embodiments of a digital signal recording apparatus, a digital signal reproduction apparatus, a digital signal transmission apparatus and a digital signal receiving apparatus will be explained with reference to FIGS. 14 to 17. In FIGS. 14 and 16, a symbol ENC designates the encoder of FIG. 1, a symbol Tin an input terminal 100 thereof, a symbol DEC the decoder in FIG. 13, and a symbol Tout an output terminal 1300 thereof.

In the recording apparatus shown in FIG. 14, the input digital signal from the input terminal Tin is supplied to and encoded in the encoder ENC. The output of the encoder ENC, i.e., the output signals from the output terminals 112, 114, 116 and 113, 115, 117 of the encoder in FIG. 1 are supplied to a modulation means MOD thereby to multiplex and then carry out a predetermined modulation, or each output signal is modulated and then multiplexed or remodulated. The modulated signal from the modulation means MOD is recorded on a recording medium M by a recording means such as a magnetic head, an optical head, etc.

Figure 15:
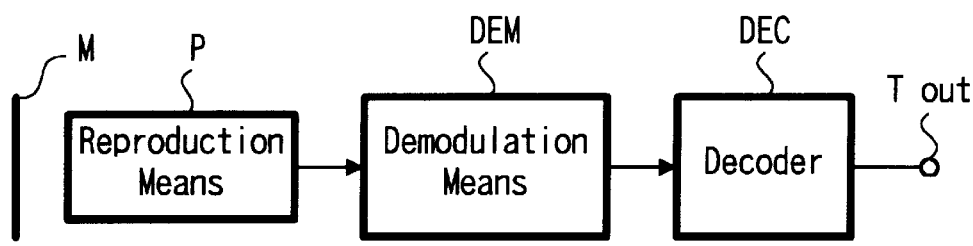
FIG. 15 is a block diagram showing a reproduction apparatus according to an embodiment of the present invention.
Figure 16:
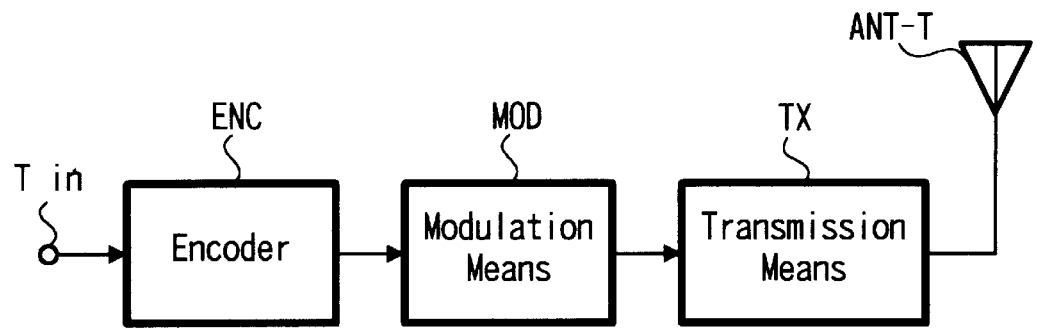
FIG. 16 is a block diagram showing a transmission apparatus according to an embodiment of the present invention.

In the reproduction apparatus shown in FIG. 15, the recorded signal on the recording medium M of FIG. 14 is reproduced by a reproduction means P such as a magnetic head, an optical head, etc., and the reproduced signal is demodulated by a demodulation means DEM in accordance with the modulation of the modulation means MOD. The demodulated output from the demodulation means DEM, i.e., the signals corresponding to the outputs from the output terminals 112, 114, 116 of the encoder shown in FIG. 1 are supplied to the input terminal 1307 of the decoder shown in FIG. 13. At the same time, the signals corresponding to the outputs from the output terminals 113, 115, 117 of the encoder shown in FIG. 1 are supplied to the input terminal 1308 of FIG. 13 to be decoded. An output digital signal corresponding to the input digital signal thus is output at the output terminal Tout.

In the transmission apparatus of FIG. 16, the input digital signal from the input terminal Tin is encoded by being supplied to an encoder ENC and then encoded thereby. The output of the encoder ENC, i.e., the output signals from the output terminals 112, 114, 116 and 113, 115, 117 of the encoder of FIG. 1 are applied to a modulation means MOD, multiplexed and then subjected to a predetermined modulation, or each output signal, after being modulated, is multiplexed or remodulated. The modulated signal from the modulation means MOD is supplied to a transmission means TX, and after frequency conversion, amplification and the like, a transmission signal is produced. This transmission signal is transmitted by a transmission antenna ANT-T constituting a part of the transmission means TX.

Figure 17:
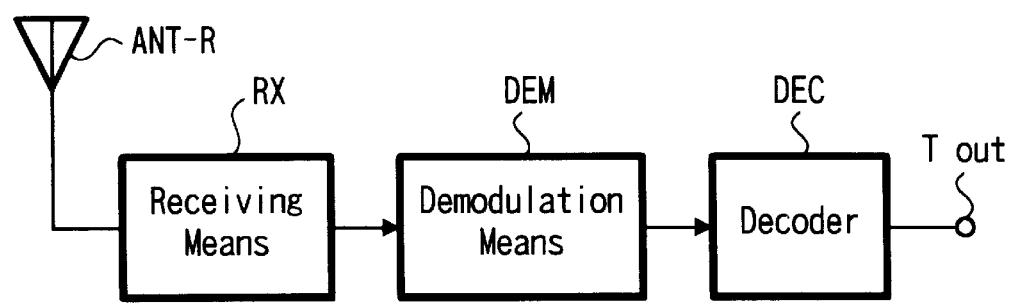
FIG. 17 is a block diagram showing a receiving apparatus according to an embodiment of the present invention.

In the receiving apparatus shown in FIG. 17, the transmission signal from the transmission antenna ANT-T shown in FIG. 16 is received by a receiving antenna ANT-R constituting a part of a receiving means RX. At the same time, the receiving signal is amplified and inversely frequency-converted by the receiving means RX. The receiving signal from the receiving means RX is demodulated by a demodulation means DEM in accordance with the modulation by the modulation means MOD. The demodulated output from the demodulation means DEM, i.e., the signals corresponding to the outputs from the output terminals 112, 114, 116 of the encoder shown in FIG. 1 are supplied to the input terminal 1307 of the decoder shown in FIG. 13. At the same time, the signals corresponding to the outputs from the output terminals 113, 115, 117 of the encoder shown in FIG. 1 are applied to the input terminal 1308 shown in FIG. 13 to be decoded, so that an output digital signal corresponding to the input digital signal is produced at an output terminal Tout.

The present invention is not limited to the above-mentioned embodiments. For example, the above-mentioned recording-reproduction medium is not necessarily integrated with and the signal compressor or the expander. Further, the signal compressor is not necessarily integrated with the expander through the recording medium. Instead, the signal compressor can be connected with the expander by a data transfer line or the like. Further, the invention is applicable not only to the audio PCM signal but also to the signal processing units such as for the digital audio signal or the digital video signal etc. as well.

Also, the recording capacity of the recording medium according to the present invention can be effectively utilized by recording the data compressed by the above-mentioned digital signal processing apparatus. Further, a magnetic disk, an IC memory or a card having the IC memory built therein, a magnetic tape or other various recording media can be used in addition to the above-mentioned optical disk as a recording medium according to the present invention.

According to the present invention described above, there are provided a digital signal processing method, a digital signal processing apparatus, a digital signal recording method, a digital signal recording apparatus, a recording medium, a digital signal transmission method or a digital signal transmission apparatus. An input digital signal is split into a plurality of frequency band components thereby to obtain signal components in a plurality of time-frequency two-dimensional blocks. Data in each of the time-frequency two-dimensional blocks are normalized based on the signal components in the two-dimensional block thereby to obtain a normalized data. A quantization coefficient representing the feature of the signal components in the two-dimensional block for each of the time-frequency two-dimensional blocks is obtained. A bit allocation amount is determined based on the quantization coefficient. The signal components in the two-dimensional block for each of the time-frequency two-dimensional blocks are quantized according to the normalized data and the bit allocation amount thereby to compress information while at the same time obtaining an information compression parameter for each of the time-frequency two-dimensional blocks. Further in the case where the total number of bits assigned to all the two-dimensional blocks fails to coincide with the bit rate specified in the encoding format then, the maximum quantization error that may occur in a two-dimensional block is calculated based on the maximum signal component in the two-dimensional block or the normalized data and the assigned bit amount provisionally calculated for each of the time-frequency two-dimensional blocks. The maximum quantization error is regarded as the degree of bit requirement for each two-dimensional block, so that the bits are adjusted based on this degree of bit requirement. The adjusting operation is performed in this way in dependence on the input digital signal, and an efficient coding is realized with an appropriate amount of processing as the adjusting operation, thereby making it possible to improve the static characteristics and the signal quality.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A digital signal processing method in which an input digital signal is split into a plurality of frequency band components thereby to obtain a signal component in a plurality of time-frequency two-dimensional blocks, data in each of said time-frequency two-dimensional blocks is normalized based on the signal component in the time-frequency two-dimensional block thereby to obtain normalized data, a quantization coefficient representing the features of the signal component in the time-frequency two-dimensional block is determined for each of said time-frequency two-dimensional blocks, a bit allocation amount is determined based on said quantization coefficient, and the signal component in the block of each of said time-frequency two-dimensional blocks is quantized according to said normalized data and the bit allocation amount thereby to compress information while at the same time obtaining an information compression parameter for each of said time-frequency two-dimensional blocks, comprising:

a step in which in the case where a total number of bits assigned to all the time-frequency two-dimensional blocks fails to coincide with a bit rate specified in a coding format as a result of converting the bit allocation amount into an integer in calculating a bit allocation amount for each of said time-frequency two-dimensional blocks, then in order to attain coincidence therebetween, a maximum quantization error that may occur in the two-dimensional block is calculated based on a maximum signal component in the time-frequency two-dimensional block or the normalized data and the assigned bit amount provisionally calculated for each of said time-frequency two-dimensional block, said maximum quantization error is regarded as the degree of bit requirement for each time-frequency two-dimensional block, so that the bits are adjusted based on said degree of bit requirement.

2. A digital signal processing method in which an input digital signal is split into a plurality of frequency band components thereby to obtain signal components of a plurality of time-frequency two-dimensional blocks, data in each of said time-frequency two-dimensional blocks are normalized based on the signal components of the time-frequency two-dimensional block thereby to obtain normalized data, a quantization coefficient representing the features of the signal components in each of said time-frequency two-dimensional blocks is determined, a bit allocation amount is determined based on said quantization coefficient, the signal components in each of said time-frequency two-dimensional blocks is quantized according to said normalized data and the bit allocation amount thereby to compress information while at the same time obtaining an information compression parameter for each of said time-frequency two-dimensional blocks, and said information-compressed signal components in a plurality of the time-frequency two-dimensional blocks are decoded using the information compression parameter for each of said time-frequency two-dimensional blocks, comprising:

a step in which in the case where a total number of bits assigned to all the time-frequency two-dimensional blocks fails to coincide with a bit rate specified in the coding format as a result of converting the bit allocation amount into an integer in calculating the bit allocation amount for each of said time-frequency two-dimensional blocks, then in order to attain coincidence therebetween, the maximum quantization error that may occur in the time-frequency two-dimensional block is calculated based on the maximum signal component in the particular time-frequency two-dimensional block or the normalized data and the assigned bit amount provisionally calculated for each of said time-frequency two-dimensional block, and said maximum quantization error is regarded as the degree of bit requirement for the particular time-frequency two-dimensional block, whereby the bits are adjusted based on said degree of bit requirement.

3. A digital signal processing apparatus having a band splitting means for splitting an input digital signal into a plurality of frequency band components, orthogonal transform means for orthogonally transforming a signal thereby to obtain signal components for encoding or analysis in a plurality of time-frequency two-dimensional blocks, normalized data calculation means for normalizing the data in each of said time-frequency two-dimensional blocks based on the signal components of the time-frequency two-dimensional block thereby to obtain normalized data, quantization coefficient calculation means for obtaining a quantization coefficient representing the features of the signal components in each of said time-frequency two-dimensional block, bit allocation calculation means for determining a bit allocation amount based on said quantization coefficient, compressed encoding means for quantizing signal components in each of said time-frequency two-dimensional blocks according to said normalized data and the bit allocation amount thereby to compress information, and information compression parameter determining means for obtaining an information compression parameter for each of said time-frequency two-dimensional blocks, comprising:

a means operating in such a manner that in the case where a total number of bits assigned to all the time-frequency two-dimensional blocks fails to coincide with a bit rate specified in the coding format as a result of converting the bit allocation amount into an integer in calculating the bit allocation amount for each of said time-frequency two-dimensional blocks, then in order to attain coincidence therebetween, the maximum quantization error that may occur in the time-frequency two-dimensional block is calculated based on the maximum signal component in the time-frequency two-dimensional block or the normalized data and the assigned bit amount provisionally calculated for each of said time-frequency two-dimensional block, and said maximum quantization error is regarded as the degree of bit requirement for each time-frequency two-dimensional block, so that the bits are adjusted based on said degree of bit requirement.

4. A digital signal processing apparatus comprising a band splitting means for splitting an input digital signal into a plurality of frequency band components, orthogonal transform means for orthogonally transforming a signal thereby to obtain signal components for encoding or analysis in a plurality of time-frequency two-dimensional blocks, normalized data calculation means for normalizing each of said time-frequency two-dimensional blocks based on the signal components in the two-dimensional block thereby to obtain normalized data, quantization coefficient calculation means for obtaining a quantization coefficient representing the features of signal components in the block for each of said time-frequency two-dimensional blocks, bit allocation calculation means for determining the bit allocation amount based on said quantization coefficient, compressed encoding means for quantizing the signal components in each of said time-frequency two-dimensional blocks according to said normalized data and the bit allocation amount thereby to compress information, information compression parameter determining means for obtaining an information compression parameter for each of said time-frequency two-dimensional blocks, and decoding means for decoding said information-compressed signal components in a plurality of the time-frequency two-dimensional blocks using the information compression parameter for each of said time-frequency two-dimensional blocks; comprising:

a means for operating in such a manner that in the case where a total number of bits assigned to all the time-frequency two-dimensional blocks fails to coincide with a bit rate specified in the coding format as a result of converting the bit allocation amount into an integer in calculating the bit allocation amount for each of said time-frequency two-dimensional blocks, then in order to attain coincidence therebetween, the maximum quantization error that may occur in the two-dimensional block is calculated based on the maximum signal component in the two-dimensional block or the normalized data and the assigned bit amount provisionally calculated for each of said time-frequency two-dimensional block, and said maximum quantization error is regarded as the degree of bit requirement for each two-dimensional block, so that the bits are adjusted based on said degree of bit requirement.

5. A digital signal recording method in which an input digital signal is split into a plurality of frequency band components thereby to obtain signal components in a plurality of time-frequency two-dimensional blocks, data in each of said time-frequency two-dimensional blocks are normalized based on the signal components in the time-frequency two-dimensional block thereby to obtain a normalized data, a quantization coefficient representing the features of the signal components in each of said time-frequency two-dimensional block is obtained for the two-dimensional block, a bit allocation amount is determined based on said quantization coefficient, the signal components in the block for each of said time-frequency two-dimensional blocks are quantized according to said normalized data and the bit allocation amount thereby to compress information, and the information is recorded on a recording medium together with an information compression parameter for each of said time-frequency two-dimensional blocks, comprising:

a step in which in the case where a total number of bits assigned to all the two-dimensional blocks fails to coincide with a bit rate specified in the coding format as a result of converting the bit allocation amount into an integer in calculating the bit allocation amount for each of said time-frequency two-dimensional blocks, then in order to attain coincidence therebetween, the maximum quantization error that may occur in the two-dimensional block is calculated based on the maximum signal component in the two-dimensional block or the normalized data and the assigned bit amount provisionally calculated for each of said time-frequency two-dimensional block, and said maximum quantization error is regarded as the degree of bit requirement for each two-dimensional block, so that the bits are adjusted based on said degree of bit requirement.

6. A digital signal recording apparatus comprising a band splitting means for splitting an input digital signal into a plurality of frequency band components, orthogonal transform means for orthogonally transforming a signal thereby to obtain signal components in a plurality of time-frequency two-dimensional blocks, normalized data calculation means for normalizing each of said time-frequency two-dimensional blocks based on the signal components for encoding or analysis in the particular time-frequency two-dimensional blocks thereby to obtain normalized data, quantization coefficient calculation means for obtaining a quantization coefficient representing the features of signal components in the two-dimensional block for each of said time-frequency two-dimensional block, bit allocation calculation means for determining a bit allocation amount based on said quantization coefficient, compressed encoding means for quantizing the signal components in the block for each of said time-frequency two-dimensional blocks according to said normalized data and the bit allocation amount thereby to compress information, and information compression parameter determining means for obtaining an information compression parameter for each of said time-frequency two-dimensional blocks, to thereby recording the outputs of both said compressed encoding means and said information compression parameter determining means on a recording medium, comprising:

a means operating in such a manner that in the case where a total number of bits assigned to all the time-frequency two-dimensional blocks fails to coincide with a bit rate specified in the coding format as a result of converting the bit allocation amount into an integer in calculating the bit allocation amount for each of said time-frequency two-dimensional blocks, then in order to attain coincidence therebetween, the maximum quantization error that may occur in the two-dimensional block is calculated based on the maximum signal component in the two-dimensional block or the normalized data and the assigned bit amount provisionally calculated for each of said time-frequency two-dimensional blocks, and said maximum quantization error is regarded as the degree of bit requirement for each two-dimensional block, so that the bits are adjusted based on said degree of bit requirement.

7. A recording medium, in which an input digital signal is split into a plurality of frequency band components thereby to obtain signal components in a plurality of time-frequency two-dimensional blocks, data in each of said time-frequency two-dimensional blocks are normalized based on the signal components in the two-dimensional block thereby to obtain a normalized data, a quantization coefficient representing the feature of the signal components in each of said time-frequency two-dimensional blocks is determined, a bit allocation amount is determined based on said quantization coefficient, the signal components in the two-dimensions for each of said time-frequency two-dimensional blocks is quantized according to said normalized data and the bit allocation amount thereby to compress information, and the information is recorded together with the information compression parameter for each of said time-frequency two-dimensional blocks, comprising:

a means in which in the case where a total number of bits assigned to all two-dimensional blocks fails to coincide with a bit rate specified in the coding format as a result of converting the bit allocation amount into an integer in calculating the bit allocation amount for each of said time-frequency two-dimensional blocks, then in order to attain coincidence therebetween, the maximum quantization error that may occur in the two-dimensional block is calculated based on the maximum signal component in the two-dimensional block or the normalized data and the assigned bit amount provisionally calculated for each of said time-frequency two-dimensional blocks, and said maximum quantization error is regarded as the degree of bit requirement for each two-dimensional block, so that the bits are adjusted based on said degree of bit requirement.

8. A digital signal transmission method in which an input digital signal is split into a plurality of frequency band components thereby to obtain signal components in a plurality of time-frequency two-dimensional blocks, data in each of said two-dimensional blocks are normalized based on the signal components in the time-frequency two-dimensional block thereby to obtain normalized data, a quantization coefficient representing the features of the signal component in the two-dimensional block for each of said time-frequency two-dimensional block is determined, a bit allocation amount is determined based on said quantization coefficient, the signal components in the two-dimensional block for each of said time-frequency two-dimensional blocks is quantized according to said normalized data and the bit allocation amount thereby to compress information, and the information is transmitted together with the information compression parameter for each of said time-frequency two-dimensional blocks, comprising:

a step in which in the case where a total number of bits assigned to all the time-frequency two-dimensional blocks fails to coincide with a bit rate specified in the coding format as a result of converting the bit allocation amount into an integer in calculating the bit allocation amount for each of said two-dimensional blocks, then in order to attain coincidence therebetween, the maximum quantization error that may occur in the two-dimensional block is calculated based on the maximum signal component in the two-dimensional block or the normalized data and the assigned bit amount provisionally calculated for each of said time-frequency two-dimensional blocks, and said maximum quantization error is regarded as the degree of bit requirement for each two-dimensional block, so that the bits are adjusted based on said degree of bit requirement.

9. A digital signal transmission apparatus comprising a band splitting means for splitting an input digital signal into a plurality of frequency band components, orthogonal transform means for orthogonally transforming a signal thereby to obtain signal components for encoding or analysis in a plurality of the time-frequency two-dimensional blocks, normalized data calculation means for normalizing data in the two-dimensional block for each of said time-frequency two-dimensional blocks based on the signal components in the two-dimensional block thereby to obtain normalized data, quantization coefficient calculation means for obtaining a quantization coefficient representing the features of signal components in the two-dimensional block for each of said time-frequency two-dimensional blocks, bit allocation calculation means for determining a bit allocation amount based on said quantization coefficient, compressed encoding means for quantizing the signal component in the block for each of said time-frequency two-dimensional blocks according to said normalized data and the bit allocation amount thereby to compress information, information compression parameter determining means for obtaining an information compression parameter for each of said time-frequency two-dimensional blocks, and transmission means for transmitting outputs of both said compressed encoding means and said information compression parameter determining means, comprising:

a means operating in such a manner that in the case where a total number of bits assigned to all the two-dimensional blocks fails to coincide with a bit rate specified in the coding format as a result of converting the bit allocation amount into an integer in calculating the bit allocation amount for each of said time-frequency two-dimensional blocks, then in order to attain coincidence therebetween, the maximum quantization error that may occur in the two-dimensional block is calculated based on the maximum signal component in the time-frequency two-dimensional block or the normalized data and the assigned bit amount provisionally calculated for each of said time-frequency two-dimensional blocks, and said maximum quantization error is regarded as the degree of bit requirement for each two-dimensional block, so that the bits are adjusted based on said degree of bit requirement.

* * * * *